United States Patent
Lu et al.

(10) Patent No.: US 10,733,072 B2
(45) Date of Patent: Aug. 4, 2020

(54) COMPUTING SYSTEM MONITORING

(71) Applicant: Nutanix, Inc., San Jose, CA (US)

(72) Inventors: Zihong Lu, Cupertino, CA (US); Abhinay Nagpal, Fremont, CA (US); Harry Hai Yang, Sunnyvale, CA (US); Himanshu Shukla, San Jose, CA (US); Shyama Sundar Duriseti, Pleasanton, CA (US); Surendran Madheswaran, Santa Clara, CA (US); Cong Liu, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 172 days.

(21) Appl. No.: 16/051,296

(22) Filed: Jul. 31, 2018

(65) Prior Publication Data
US 2019/0340094 A1 Nov. 7, 2019

Related U.S. Application Data

(63) Continuation-in-part of application No. 29/624,798, filed on Nov. 3, 2017, now Pat. No. Des. 854,563.

(51) Int. Cl.
*G06F 11/30* (2006.01)
*H04L 12/26* (2006.01)
(Continued)

(52) U.S. Cl.
CPC ...... *G06F 11/3006* (2013.01); *H04L 41/0618* (2013.01); *H04L 41/142* (2013.01);
(Continued)

(58) Field of Classification Search
CPC .. G06F 11/3006; H04L 41/142; H04L 41/147; H04L 41/16; H04L 43/08; H04L 43/16; H04L 63/1425; H04L 63/1441
See application file for complete search history.

(56) References Cited

U.S. PATENT DOCUMENTS 8,549,518 B1 10/2013 Aron et al.
8,601,473 B1 12/2013 Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Mohamed A. Wasel
(74) *Attorney, Agent, or Firm* — Vista IP Law Group, LLP

(57) ABSTRACT

Systems for alerting in computing systems. A method commences by defining a plurality of analysis zones bounded by respective ranges of system metric values, which ranges in turn correspond a plurality of system behavior classifications. System observations are taken while the computing system is running. A system observation comprising a measured metric value is classified into one or more of the behavior classifications. Based on the classification, one or more alert analysis processes are invoked to analyze the system observation and make a remediation recommendation. An alert or remediation is raised or suppressed based on one or more zone-based analysis outcomes. An alert is raised when anomalous behavior is detected. The system makes ongoing observations to learn how and when to classify a measured metric value into normal or anomalous behaviors. As changes occur in the system configuration, the analysis zones are adjusted to reflect changing bounds of the zones.

20 Claims, 16 Drawing Sheets

(51) Int. Cl.
*H04L 12/24* (2006.01)
*H04L 29/06* (2006.01)
(52) U.S. Cl.
CPC ............ *H04L 41/147* (2013.01); *H04L 41/16* (2013.01); *H04L 43/08* (2013.01); *H04L 43/16* (2013.01); *H04L 63/1425* (2013.01); *H04L 63/1441* (2013.01)

(56) References Cited

U.S. PATENT DOCUMENTS

| | | | |
|---|---|---|---|
| 8,850,130 | B1 | 9/2014 | Aron et al. |
| 9,772,866 | B1 | 9/2017 | Aron et al. |
| 9,779,504 | B1 * | 10/2017 | Biagiotti ............ G06F 16/5838 |
| 2006/0282893 | A1 * | 12/2006 | Wu .................... H04L 63/1441 726/23 |
| 2011/0301998 | A1 * | 12/2011 | Talwar ............. G06Q 10/06316 705/7.26 |
| 2012/0163212 | A1 * | 6/2012 | Lee ........................ H04L 43/04 370/252 |
| 2014/0172971 | A1 | 6/2014 | Akkurt et al. |
| 2015/0370876 | A1 | 12/2015 | Rickard |
| 2017/0076576 | A1 * | 3/2017 | Tan .................... G08B 21/0476 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Czechowski, Aaron et al. "Use alerts and the status system for System Center Configuration Manager" (Oct. 5, 2016), from https://docs.microsoft.com/en-us/sccm/core/servers/manage/use-alerts-and-the-status-system.
Non-Final Office Action dated Jul. 1, 2019 for related U.S. Appl. No. 15/186,400.
Non-Final Office Action dated Oct. 4, 2019 for related U.S. Appl. No. 15/186,400.
Cano, I. et al., "Curator: Self-Managing Storage for Enterprise Clusters", 14th USENIX Symposium on Networked Systems Design and Implementation, NSDI '17, (Mar. 27, 2017).

* cited by examiner

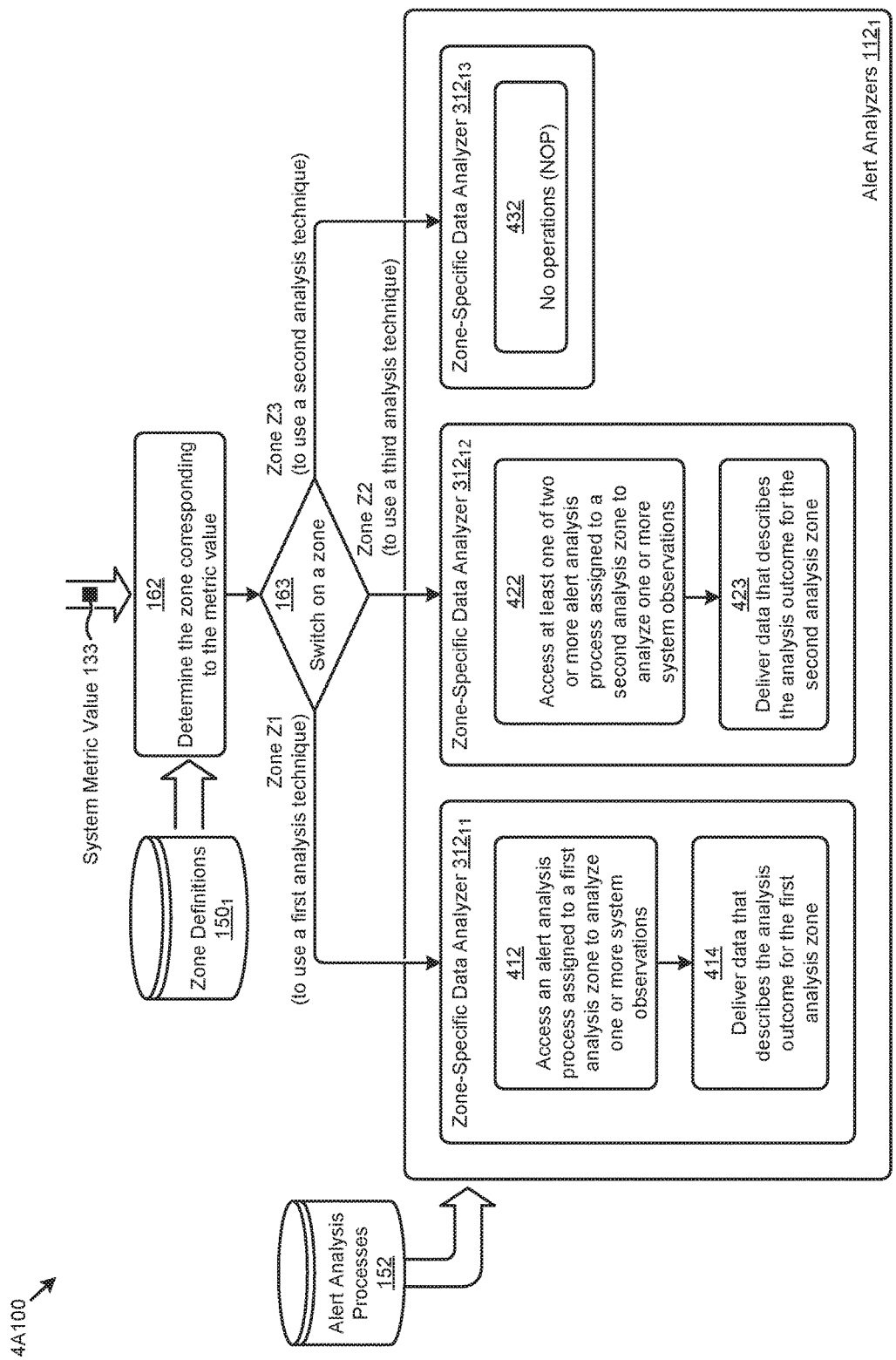
FIG. 4A1

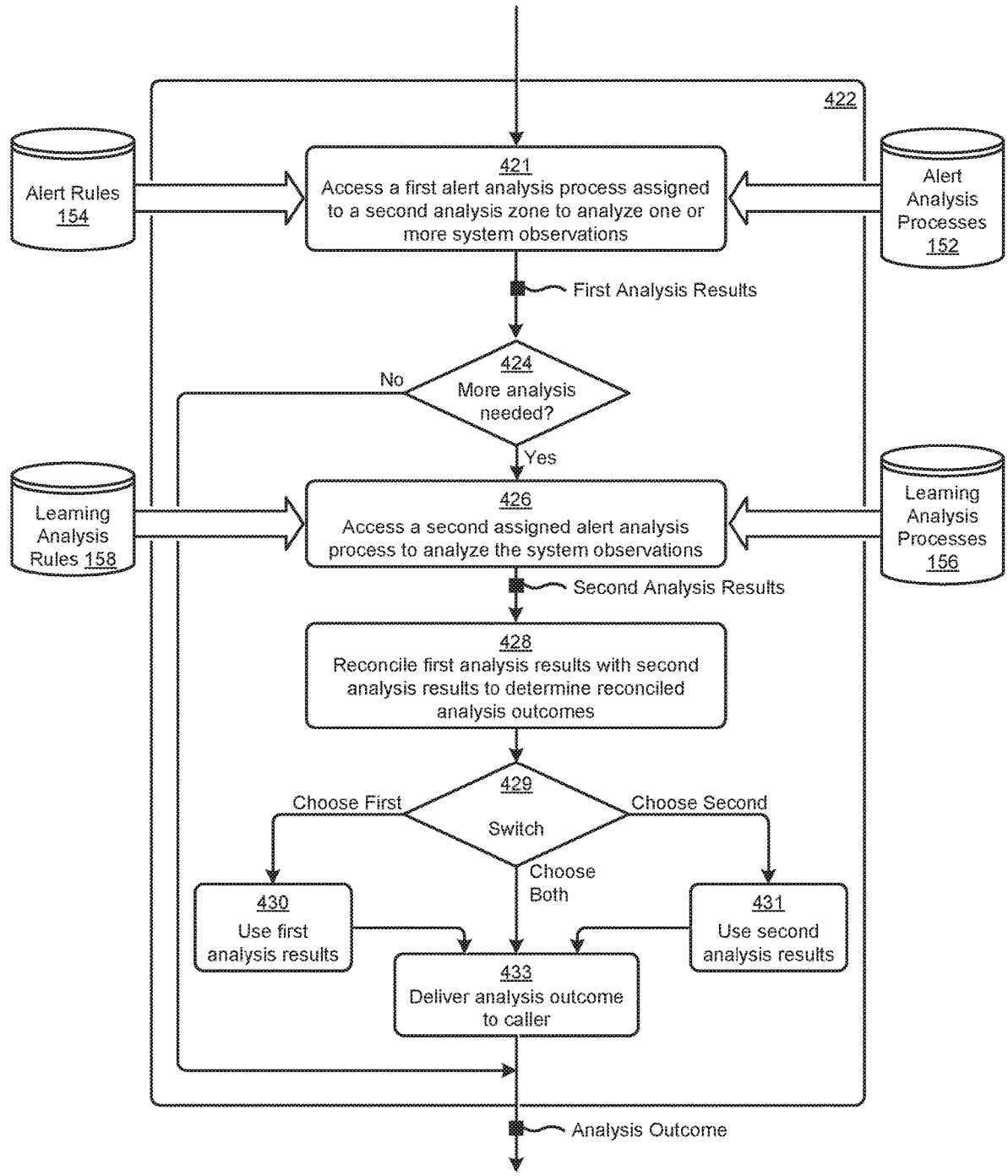
FIG. 4A2

COMPUTING SYSTEM MONITORING

RELATED APPLICATIONS

The present application claims the benefit of priority to co-pending U.S. patent application Ser. No. 29/624,798 titled "COMBINED DYNAMIC AND STATIC ANOMALY INFORMATION FOR A DISPLAY SCREEN OR PORTION THEREOF", filed Nov. 3, 2017, which is hereby incorporated by reference in its entirety.

FIELD

This disclosure relates to distributed computing systems, and more particularly to techniques for computing system monitoring.

BACKGROUND

Computing systems are becoming more and more complex. In some contemporary settings, a computing system might comprise hundreds of computing nodes that support thousands (or more) virtualized entities (e.g., virtual machines, executable containers, etc.) running a broad mix of workloads (e.g., applications, tasks, web services, user processes, system processes, etc.). Providers of such large scale, highly dynamic computing systems have implemented various techniques to facilitate characterization and monitoring of the behavior or "health" of the systems. As an example, certain system health monitoring tools might collect observations of various system behaviors related to measurable system metrics (e.g., CPU usage, occurrences of different types of input/output (I/O or IO) operations, I/O latency, etc.), compare the observations to expected behaviors or values, and then emit system messages when the observations breach corresponding expected values and/or ranges and/or time limits. For example, if a set of observations suggest that 97% of available cycles of a CPU are being used consistently for several minutes or more, that might be considered to breach an established CPU headroom value (e.g., 95%) for CPU usage, and a warning message or some other sort of alert might be emitted (e.g., to an administrative dashboard). In this case, static threshold values (e.g., a CPU headroom threshold value and a time period threshold value) are applied to determine whether or not to emit an alert. In other cases, further thresholds (e.g., 0% to 50% CPU utilization) can be defined to bound normal/acceptable behavior.

Unfortunately, there is often uncertainty in the range between the deemed normal threshold and the abnormal threshold. This is a "grey area" where the observed behavior might be deemed to be normal or might be deemed to be abnormal. Failure to consider this "gray area" often produces alerts that are not meaningful in determining the actual health and/or normal behaviors of the computing system (e.g., false alarms). Also, failure to consider this "gray area" can mask alerts that should be emitted (e.g., missed alerts). As an example, implementing static threshold values to determine behavioral alerts does not take into account the dynamic nature of the configuration and workloads of a modern computing system where VMs might temporarily demand a lot of CPU resources, but then settle down into a lower range. As such, a system administrator might receive dozens or hundreds of alerts on a given day, many of which might be false alarms that correspond to behavior that would be considered to be normal given the then-current configuration and/or workload. In the wake of so many false alarms, the system administrator might begin to ignore such alerts, thereby potentially overlooking meaningful alerts that are buried in the dozens or hundreds of alerts.

Furthermore, the aforementioned approaches miss various other types of abnormal behaviors. For example, if a database is normally accessed at a rate of 10,000 transactions per hour, and in some hour-long observation period the observed number of transactions is only 500, a system that has implemented merely a threshold to test for a maximum transaction rate will not trigger an alert, thus failing to alert the administrator to the possibility of system problems that might be the cause of the low transaction rate. Still further, alert thresholds that are derived from historical observations will inherently have some noise and/or errors in the accuracy of the threshold values, which can lead to still more erroneous or unnecessary alert reporting.

What is needed is an approach to computing system health monitoring and handling of alerts that limits or eliminates erroneous or unnecessary alert reporting.

SUMMARY

The present disclosure describes techniques used in systems, methods, and in computer program products for computing system monitoring, which techniques advance the relevant technologies to address technological issues with legacy approaches. More specifically, the present disclosure describes techniques used in systems, methods, and in computer program products for multi-zone analysis of computing system metrics. Certain embodiments are directed to technological solutions for partitioning computing system metric observation spaces into multiple zones that are associated with respective analysis mechanisms that can track system behaviors and raise alerts when behaviors are deemed to be anomalous.

The disclosed embodiments modify and improve over legacy approaches. In particular, the herein-disclosed techniques provide technical solutions that address the technical problems attendant to providing accurate and meaningful system behavior alerts in highly dynamic computing systems. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of computing system management as well as advances in various technical fields related to computer behavioral modeling.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 4A1 and FIG. 4A2 depict zone-based analysis techniques as implemented in systems that facilitate multi-zoned analysis of computing system metrics, according to an embodiment.

DETAILED DESCRIPTION

Figure 1A:
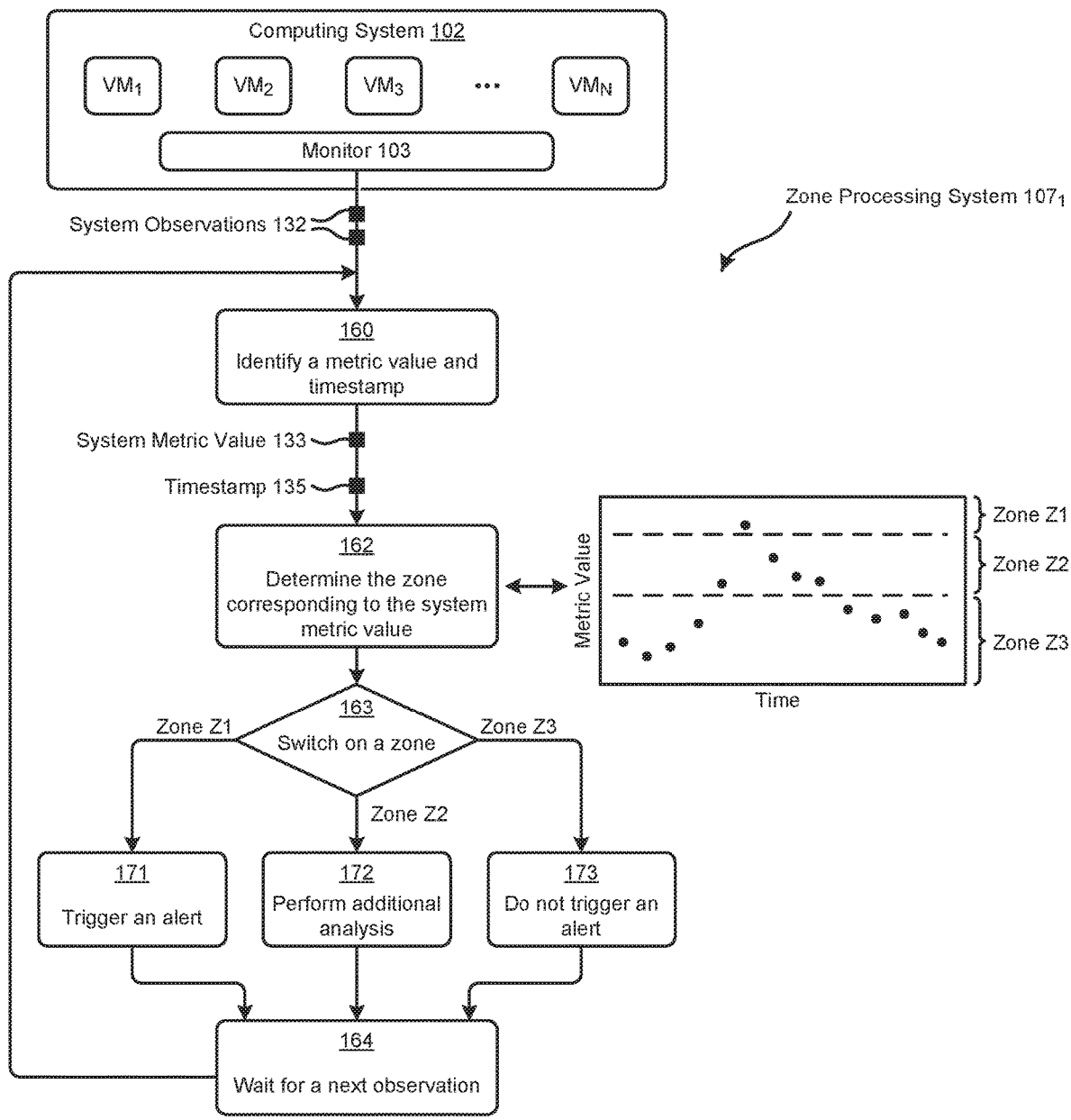
FIG. 1A illustrates a multi-zone alerting technique, according to some embodiments.

Embodiments in accordance with the present disclosure address the problem of providing accurate and meaningful system behavior alerts in highly dynamic computing systems. Some embodiments are directed to approaches for partitioning computing system metric observation spaces into multiple zones that are associated with respective analysis mechanisms that can track system behaviors and raise alerts when behaviors are deemed to be anomalous. The accompanying figures and discussions herein present example environments, systems, methods, and computer program products for multi-zoned analysis of computing system behaviors.

Overview

Computing system administrators are tasked with keeping the system for which they have responsibility running smoothly. As computing systems have become more and more complex, and as the cost of a "downed" system becomes greater and greater, system administrators have come to rely on system alerts that are intended to alert the administrator to a system problem (e.g., either a currently observed problem or a warning of a problem that might soon ensue). Some systems implement monitoring of a various system metrics (e.g., CPU load, network usage, I/O latencies, etc.). When a metric value exceeds some static threshold, an alert is issued so that the system administrator can consider what sort of remediation is needed (if any). In many cases, the use of static thresholds can cause a flood of alerts.

For example, if a static threshold for CPU utilization is set to 80% and a virtual machine is observed to have used 80.0001%, an alert is emitted. Suppose a few milliseconds later the virtual machine is observed to have used 79.9999%. This would not trigger an alert. Further suppose that a few additional milliseconds later the virtual machine is observed to have used 80.0001%. Another alert would be raised. Thus, as can be seen by the foregoing example, use of a static threshold alone to determine if a virtual machine is behaving normally or anomalously is defective at least in that, as is clearly demonstrated in the example, the difference of 0.0002% is dispositive as to whether the behavior is considered to be normal or whether the behavior is considered to be abnormal. This regime is not only intuitively defective, but also ignores the possibility that 0.0002% might be within the noise levels of the measurements. Furthermore, merely providing a plus-or-minus band around a static threshold does not address the underlying problem.

One way to address the foregoing deficiencies is to consider behaviors in the "grey area" so as to determine, for example, if the observations over time are so sufficiently temporary or otherwise deemed to be normal such that they can be ignored. This is different from merely setting the static thresholds in that observations that arise the "grey area" can be checked against learned behavior. If the learned behavior is such that observations that arise the "grey area" are deemed to be normal, then an alert need not be emitted. Strictly as one example, a group of virtual machines might exhibit high CPU utilization each morning at around 9 am, as workers login. This pattern can be identified by machine learning techniques, and the pattern can be classified as acceptable behavior even though the aforementioned exhibition of high CPU utilization is greater than a statically-defined high end of the normal band.

Accordingly, to remedy the deficiencies of the foregoing, disclosed herein are techniques for partitioning computing system metric observations into multiple zones, which zones are used to determine handling of system observations. In some embodiments, a set of rules are applied to outcomes of zone-based analyses to determine what actions, if any, are to be taken.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a multi-zone alerting technique 1A00 as used in a computing system 102. As processes run in the computing system, a monitor makes observations. These observations include system metrics (quantified values) that are considered with respect to several zones. After considering the observation with respect to the zones, a decision is made to determine next steps to take. In some cases, an alert is triggered (e.g., when the observation is deemed to be unquestionably anomalous), in some cases an alert is not triggered (e.g., when the observation is deemed to be indicative of normal behavior), and in some cases the observations are subjected to additional consideration before determining to trigger an alert or not.

The processes that run in the computing system can be any sort of process that is observable using any technique. As shown, the computing system hosts a plurality of virtual machines (VMs). The VMs (e.g., $VM_1$, $VM_2$, $VM_3$, $VM_N$) are monitored over time as the VMs execute. Behavioral measurements (e.g., system observations 132) are taken over time and reported to the shown zone processing system 107_1. A system observation comprises a measured value of a system metric (e.g., system metric value 133) as well as a time indication (e.g., timestamp 135). As such, at step 160, the observed metric value and time of the observation can be identified. The value of the system metric is used in combination with zone definitions so as to determine a corresponding zone for that observation. Specifically, at step 162, a system observation having a metric value in a high range is determined to be in Zone Z1 (as shown in the graph), whereas a system observation having a metric value in a low range is determined to be in Zone Z3, and so on.

The determination of the corresponding zone is then used in a logic flow that performs different processing for the different zones. In this example, there are three zones, Zone1 (Z1), Zone2 (Z2), and Zone3 (Z3). Accordingly, switch 163 will flow to step 171, step 172 or step 173 depending on whether the subject observation is within the Z1 range, the Z2 range or the Z3 range. Each of the shown flows (e.g., to step 171, step 172 or step 173) employs a different analysis technique. More specifically, the flow corresponding to zone Z1 employs a first analysis technique, the flow corresponding to zone Z3 employs a second analysis technique, and the flow corresponding to zone Z2 employs a third analysis technique. Strictly as an example, the first analysis technique might use a single rule in a single analysis process, and whereas the second analysis technique might use a different rule in a single analysis process, and whereas the third analysis technique might use two or more analysis processes.

In this flow, the operations of step 171 will trigger an alert, whereas the operations of step 173 will not trigger an alert. In the event that the subject observation is within the Z2 range, this observation is in the "grey area" and, as shown, performance of additional processing is initiated. The additional processing serves to determine whether or not the subject observation should trigger an alert or not. More specifically, determination as to whether or not the subject observation should trigger an alert or not is based on previously established and/or learned bounds of zone Z2. Further details of this additional processing are given infra.

An initial set of zone definitions that correspond to one or more of the computing system metrics is sometimes established manually for a subject computing system. An example zone definition might describe the bounds of two or more analysis dimensions that constitute a multi-dimensional space associated with a particular metric (e.g., CPU usage vs. day of the week). Also, an initial set of analysis processes are assigned to each zone. In the foregoing example, the analysis process for zone Z1 compares the system metric to the zone Z1 boundaries and triggers an alert. In the foregoing example, the analysis process for zone Z3 compares the system metric to the zone Z3 boundaries and does not raise an alert. The analysis process for zone Z2 initiates additional analysis, which analysis might be rule-based or learning-model based, or both.

After determining the applicable zone so as to initiate a corresponding analysis process, the zone processing system 107_1 waits for a next incoming observation (step 164). In some embodiments the monitor 103 operates asynchronously with the zone processing system 107_1 and implements a queueing mechanism to handle the asynchrony. In other embodiments, the zone processing system 107_1 requests that observations be taken by the monitor 103.

In modern computing systems, some of the analysis processes that correspond to any particular zone can become more extensive as complications pertaining to the corresponding zone arise. In particular, the analysis processes of zone Z2 might involve application of a set of rules to the observation and/or consulting with machine learning models so as determine how to handle the observation (e.g., to deem the observation as normal behavior or to deem it as an anomaly).

Some of the aforementioned complications occur in computing environments such as given in the following FIG. 1B. More particularly, a zone processing system 107_1 that addresses some of the complications can be implemented in the computing environment of FIG. 1B.

Figure 1B:
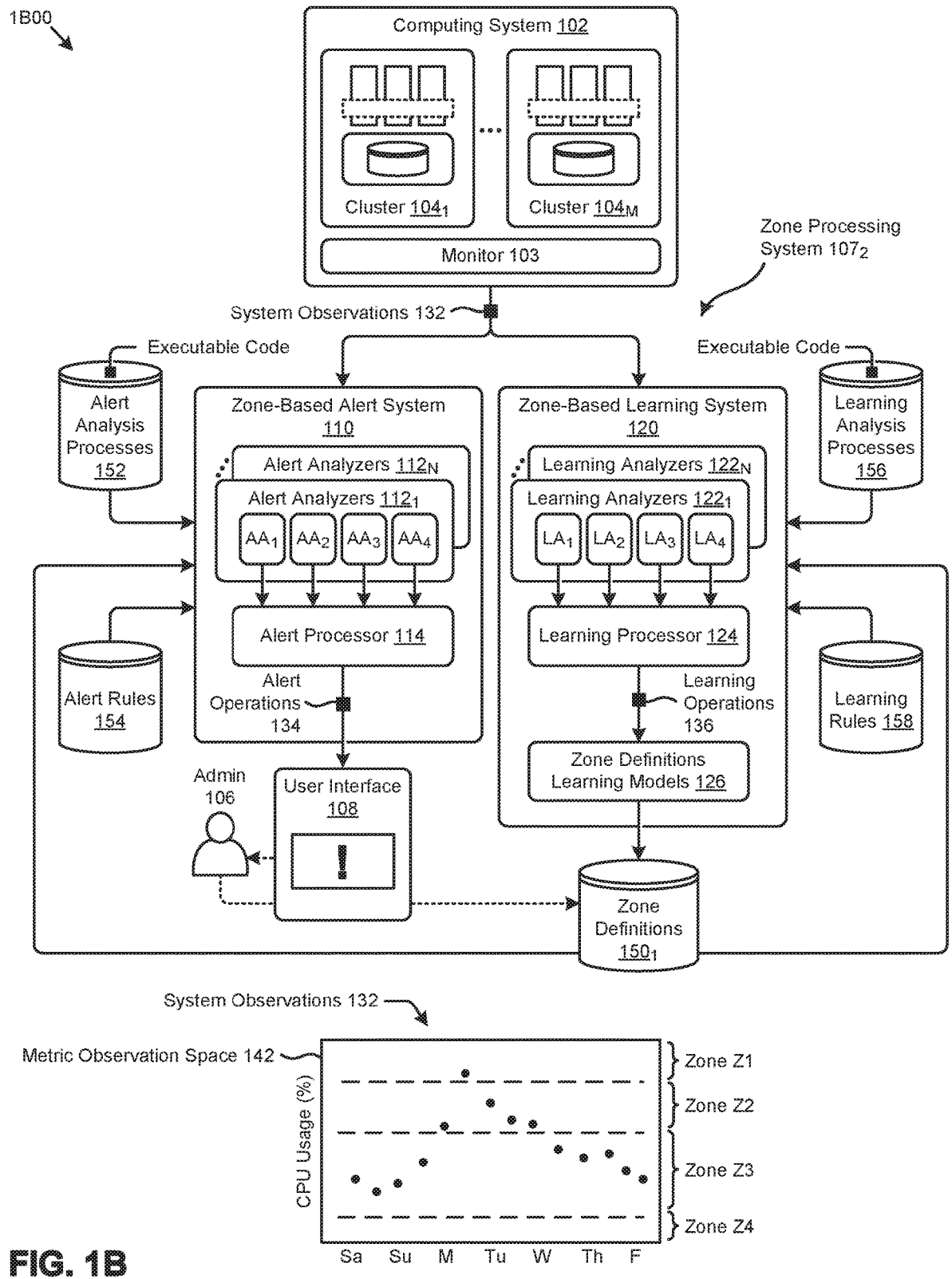
FIG. 1B illustrates a computing environment in which embodiments of the present disclosure can be implemented.

FIG. 1B illustrates a computing environment 1B00 in which embodiments of the present disclosure can be implemented. As an option, one or more variations of computing environment 1B00 or any aspect thereof may be implemented in the context of the architecture and functionality of the embodiments described herein.

As heretofore discussed, the analysis processes that are assigned to the various zones might pertain solely to handling of alerts, or might pertain to handling of learning, or both. Accordingly, the zone processing system 1072 of FIG. 1B includes both a zone-based alert system 110 and a zone-based learning system 120. Both the zone-based alert system 110 as well as the zone-based learning system 120 serve to process system observations. Strictly for ease of description, the zone-based alert system 110 and the zone-based learning system 120 are illustrated side-by-side, however portions of the zone-based learning system 120 could be implemented within the zone-based alert system 110 and vice versa.

As shown, system observations 132 pertaining to various system behavioral and/or performance metrics are collected by a monitor 103 (e.g., involving any combination of monitors on the same computing system and/or monitors hosted on different computing systems). Then, one or more of the then-current observations for a particular metric are analyzed in accordance with the alert and/or learning analysis processes assigned to each analysis zone of that particular metric. This is shown in FIG. 1B as the alert analyzers (e.g., alert analyzer $112_1$ . . . , alert analyzer $112_N$) and the learning analyzers (e.g., learning analyzers $122_1$, . . . , learning analyzers $122_N$).

As pertaining to alert processing through the alert analyzers, a set of alert rules are applied to the outcomes of the zone-based alert analyses to determine what, if any, actions are to be taken. Such actions might include issuing an alert, issuing a recommendation, invoking a mitigation operation (e.g., a VM migration), and/or other actions.

In certain embodiments, one or more of the shown zone definitions are based at least in part on a learning model. In such embodiments, incoming observations are analyzed to determine a set of learning operations for interacting with a learning model. In certain embodiments, the one or more analysis processes assigned to an analysis zone can comprise any or all of threshold comparisons, and/or application of rule-based logic, and/or use of learning models for anomaly detection (e.g., using a statistical models and/or predictive modeling). In some embodiments, specific combinations of the foregoing analysis processes are performed in a particular sequence based on calculated uncertainties (e.g., error analysis or statistical measurements).

The configuration shown in FIG. 1B illustrates one particular partitioning of processes in computing system that serve to track system behaviors and raise alerts when behaviors are deemed to be anomalous. Specifically, the figure presents a logical depiction of how the herein disclosed techniques can be implemented in a computing environment to perform zone-based analyses of computing system observations.

As shown, computing system 102 comprises multiple computing clusters (e.g., cluster $104_1$, . . . , cluster $104_M$). Such clusters can comprise hundreds of computing nodes that support thousands (or more) virtualized entities (e.g., virtual machines, executable containers, etc.) running a broad mix of workloads (e.g., applications, tasks, web services, user processes, system processes, etc.). As earlier described, the provider of the computing system 102 might implement various techniques to facilitate characterization and monitoring of the behavior or "health" of the system. For example, certain system health monitoring tools might collect a set of system observations 132 that correspond to various measurable system metrics (e.g., CPU usage, occurrences of different types of I/O operations, I/O latency, etc.), compare the observations to expected behavior, and then emit alerts when the observations are deemed anomalous as compared to the expected behavior. The alerts might be emitted for presentation at a user interface 108 of a system administrator (e.g., admin 106).

As earlier indicated, some techniques produce alerts that are not meaningful in determining the actual health and/or normal behaviors of the computing system. As an example, some techniques for determining behavioral alerts do not take into account ongoing changes to the computing configuration that occur in modern computing systems (e.g., computing system 102).

By partitioning metric observation spaces of computing system metrics into multiple analysis zones that are assigned to one or more analysis mechanisms, meaningful alerts can be raised when certain behavior is observed, whereas, unnecessary alerts (e.g., arising from acceptable transient behavior or learned normal behavior) can be reduced or eliminated. FIG. 1B depicts a set of zone definitions $150_1$ that correspond to one or more of the computing system metrics established for computing system 102. Such zone definitions are flexible and dynamic enough that the many complications that are seen in modern computing systems can be handled. Strictly as one example, a zone definition might describe the ranges of two or more analysis dimensions that constitute a multi-dimensional space associated with a particular metric. More specifically, as can be observed, a metric observation space 142 for a "CPU Usage (%)" metric over days of the week might be partitioned into four zones (e.g., zone Z1, zone Z2, zone Z3, and zone Z4).

A zone-based alert system 110 is implemented to receive the system observations 132 and route the observations to sets of alert analyzers (e.g., alert analyzers $112_1$, . . . , alert analyzers $112_N$). Each set of alert analyzers can be configured to correspond to a particular computing system metric. As an example, alert analyzers $112_1$ might comprise four alert analyzers (e.g., identified as "$AA_1$," "$AA_2$," "$AA_3$," and "$AA_4$") that correspond respectively to the four analysis zones of the earlier described "CPU Usage (%)" metric.

One or more of a set of alert analysis processes 152 are assigned to each respective analysis zone of the computing system metrics to perform zone-based alert analyses over the system observations 132. An alert analysis process is code, including executable portions of code and data accessed by the executable portions of the code that implement techniques to facilitate classifications of observations into one or more zones. The alert analysis processes 152 might implement threshold comparators, rule-based logic, anomaly detectors, statistical models, predictive models, and/or other techniques to facilitate classifications of observations into one or more zones. In this case, the portion of the system observations 132 corresponding to a particular metric are analyzed in accordance with the alert analysis processes assigned to the analysis zones of that particular metric. As an example, "CPU Usage (%)" observations are analyzed at the zone-based alert system 110 by applying alert analyzer "$AA_1$" in accordance with the alert analysis process (e.g., maximum threshold comparator) assigned to zone Z1, alert analyzer "$AA_2$" operates in accordance with the a different analysis processes (e.g., transient threshold comparator and anomaly detector) that is assigned to zone Z2, and alert analyzer "$AA_3$" operates in accordance with the alert analysis process (e.g., no assigned function or "ignore" observation checks) assigned to zone Z3.

In addition to the abovementioned three zones (zone Z1, zone Z2, and zone Z3), this example includes a fourth zone, namely zone Z4. Alert analyzer "$AA_4$" operates in accordance with whatever particular alert analysis process (e.g., minimum threshold comparator) has been assigned to zone Z4. For purposes of human comprehension, a description and/or a set of semantics might be applied to each zone. Table 1 provides one example of such descriptions and semantics.

TABLE 1

Zone descriptions/semantics

| Zone ID | Description/Semantics |
|---|---|
| Zone Z1 | An observation that falls in the Z1 range will trigger an alert. The zone Z1 bounds high values that are indicative of current or impending unwanted behavior (e.g., extremely high usage). |
| Zone Z2 | An observation that falls in the Z2 range might or might not trigger an alert. The zone Z2 bounds measurement values that are outside of a given normal or expected behavior range, yet might not be immediately indicative of a system problem. |
| Zone Z3 | An observation that falls in the Z3 range will be deemed to be normal behavior and will not trigger an alert. |
| Zone Z4 | An observation that falls in the Z4 range will trigger an alert. The zone Z4 bounds low measurements that are indicative of current or impending unwanted behavior (e.g., extremely low usage, possibly due to a network or other outage). |

In addition to the foregoing zones as described in Table 1, additional zones can be described and/or maintained. For example, a first additional zone might correspond to a narrow range where a first particular mitigation is indicated, and a second additional zone might correspond to a narrow range where a second particular mitigation is indicated. More specifically, the first mitigation might be to allocate additional resources to the VM and the second mitigation might be to move the VM to another node where additional resources are known to be available.

The semantics of the foregoing zone definitions can be coded into the zone-based alert system to generate analysis outcomes per zone. A set of alert rules 154 are applied by an alert processor 114 to the per-zone analysis outcomes to determine which, if any, alert operations 134 are to be performed. Such alert operations 134 might include issuing an alert, issuing a recommendation, invoking a mitigation operation (e.g., a VM migration), and/or other operations. As an example, a data point in the metric observation space 142 might trigger an alert according to the zone-based analysis facilitated by the herein disclosed techniques. In this case, an instance of alert operations 134 might include HTTP calls to user interface 108 so as to alert the administrator (e.g., admin 106) via an indication (e.g., via graphical elements in the user interface) of the alert itself as well as information pertaining to the alert.

In the embodiment of FIG. 1B, one or more of the zone definitions $150_1$ might be based at least in part on zone definitions learning models 126 managed by zone-based learning system 120. The zone definitions learning models 126 are established at least in part by outputs from a plurality of learning analyzers (e.g., learning analyzers $122_1$, ..., learning analyzers $122_N$), each of which corresponds to a respective computing system metric. As an example, learning analyzers $122_1$ might comprise four learning analyzers (e.g., identified as "$LA_1$", "$LA_2$", "$LA_3$", and "$LA_4$") that correspond respectively to the four analysis zones of the earlier described "CPU Usage (%)" metric. One or more of a set of learning analysis processes 156 are assigned to each respective analysis zone of the computing system metrics to perform zone-based learning analyses over the system observations 132.

Various types of system observations are routed to corresponding learning analyzers of the zone-based learning system 120. The learning analysis processes 156 might facilitate selection of only certain sets of learning model training data (e.g., that are subjected to quantifiable precision and/or recall objectives). In this case, the portion of the system observations 132 corresponding to a particular metric are analyzed in accordance with the learning analysis processes assigned to the analysis zones of that particular metric. As an example, "CPU Usage (%)" observations are analyzed at the zone-based learning system 120 by applying learning analyzer "$LA_1$" in accordance with the learning analysis process assigned to zone Z1, by applying learning analyzer "$LA_2$" in accordance with the learning analysis process assigned to zone Z2, by applying learning analyzer "$LA_3$" in accordance with the learning analysis process assigned to zone Z3, and by applying learning analyzer "$LA_4$" in accordance with the learning analysis process assigned to zone Z4.

A set of learning rules 158 are applied by a learning processor 124 to the analysis outcomes of the zone-based analyses to determine what, if any, learning operations 136 are to be performed. Learning operations are actions that are taken over system observations and/or learning models. Such learning operations 136 might access the zone definitions learning models 126. As a specific example, access (e.g., a query) to a zone definition learning model might return results that are indicative of a periodicity characteristic that can be considered in training behavioral models and/or zone functions.

The zone-based alert and learning analyses facilitated by the herein disclosed techniques provide accurate and meaningful system behavior alerts in highly dynamic computing systems. As such, application of the techniques disclosed herein facilitate improvements in computer functionality that serve to reduce the demand for computer memory, reduce the demand for computer processing power, reduce network bandwidth use, and reduce the demand for inter-component communication. Specifically, when using a zone-based approach, each system observation can be analyzed with respect to a corresponding zone. As such, not all of the system observations need to be analyzed using machine learning techniques.

For example, observations in zone Z1 and/or zone Z3 can be processed with simple Boolean tests, whereas analysis of an observation that falls into Zone Z2 might invoke accesses to a machine learning system. Such machine learning accesses (e.g., for delivering queries and for retrieving results) can be costly in terms of memory usage, computing power, network bandwidth, etc. Therefore, the reduction of computing resources used as a result of a reduction of the number of system observations that undergo machine learning or other resource-intensive analysis can be quite significant. Moreover, in modern computing systems, observations may be taken at very high rates, such as 1 million observations per second. Thus, the savings of computing resources (e.g., memory, CPU cycles, network bandwidth, etc.) can be enormous.

One embodiment of techniques for multi-zoned computing system monitoring is disclosed in further detail as follows.

Figure 2:
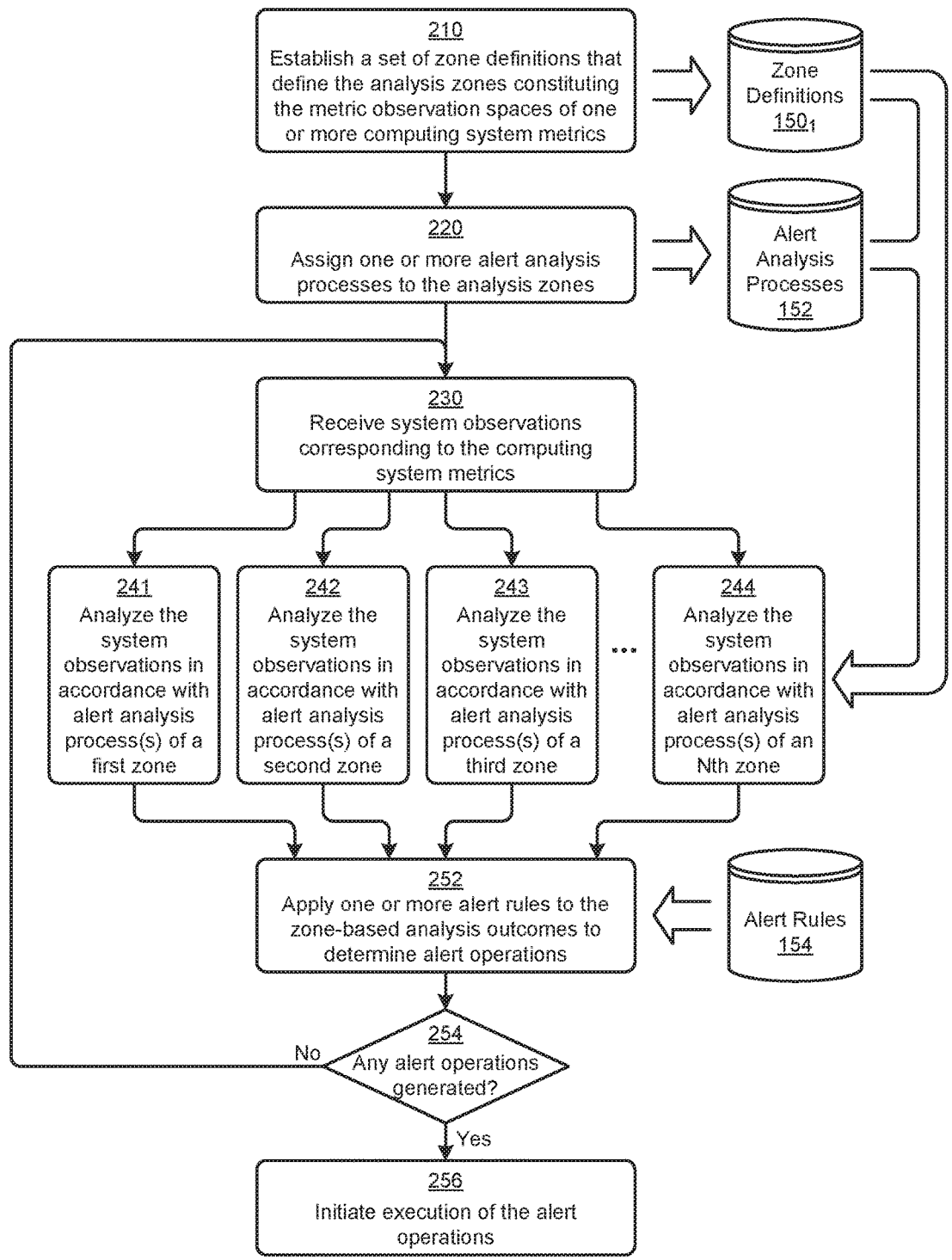
FIG. 2 depicts a multi-zoned computing system monitoring technique as implemented in systems that facilitate multi-zoned analysis of computing system metrics, according to an embodiment.

FIG. 2 depicts a multi-zoned computing system monitoring technique 200 as implemented in systems that facilitate multi-zoned analysis of computing system metrics. As an option, one or more variations of multi-zoned computing system monitoring technique 200 or any aspect thereof may be implemented in the context of the architecture and functionality of the embodiments described herein. The multi-zoned computing system monitoring technique 200 or any aspect thereof may be implemented in any environment.

FIG. 2 illustrates one aspect pertaining to partitioning computing system metric observation spaces into multiple zones that are associated with respective analysis mechanisms to track system behaviors and raise alerts when behaviors are deemed to be anomalous. More specifically, the figure illustrates (1) how zones are initially defined, (2) a step for assigning analyses to the zones, and (3) an ongoing flow for determining and initiating alert operations.

In this particular embodiment, the zone definitions $150_1$ and alert analysis processes 152 form the basis for a series of analysis operations (the operations of step 241, step 242, step 243, step 244) that are performed to produce analysis outcomes that are in turn filtered using alert rules. In some cases, the particular combination of analysis outcomes and rule-based filtering can result in initiation of alert operations (e.g., logging, sending an alert message to a user interface, etc.)

The multi-zoned computing system monitoring technique 200 can commence by establishing a set of zone definitions that define the analysis zones constituting the metric observation spaces of one or more computing system metrics (step 210). As an example, the zone definitions might comprise various data objects stored in zone definitions $150_1$. One or more alert analysis processes, such as the alert analysis processes 152, are assigned to the analysis zones (step 220). A particular analysis zone might be assigned zero alert analysis processes, or one alert analysis process, or multiple alert analysis processes. In the latter case, the multiple alert analysis processes might be executed sequentially or concurrently, and/or might be conditionally executed.

System observations that correspond to the computing system metrics are received (step 230). Some or all of the system observations are analyzed in accordance with the alert analysis process assigned to each of any number of analysis zones. Specifically, and as shown, the system observations are analyzed in accordance with the alert analysis process or processes of a first zone (step 241), the alert analysis process or processes of a second zone (step 242), the alert analysis process or processes of a third zone (step 243), and/or the alert analysis process or processes of an Nth zone (step 244).

A set of alert rules 154 are applied to the zone-based analysis outcomes generated by the foregoing analysis and/or constituent steps to determine one or more alert operations (step 252). Such alert rules might, for example, resolve conflicts between two or more zone-based analysis outcomes, or map an alert level (e.g., severity) to corresponding alert operations (e.g., display, recommend, mitigate, etc.). If no alert operations are generated (see "No" path of decision 254), then the multi-zoned computing system monitoring technique 200 continues by receiving a next set or instance of system observations (step 230). If one or more alert operations are generated from the zone-based alert analyses (see "Yes" path of decision 254), then a set of alert data is prepared to facilitate execution of the alert operations (step 256). Characteristics of the set of alert data depends at least in part on characteristics of the analysis outcome(s) and/or the rules and/or the result of application of rules to outcomes. More particularly, characteristics of the aforementioned analysis outcomes are often based at least in part on the system observations as compared with particular analysis zone definitions. The zone definitions can be manually constructed and/or updated over time, or the zone definitions can be automatically constructed or automatically updated over time.

In particular, the same zones that are associated with respective alert analysis mechanisms can be employed to track system behaviors so as to raise alerts when behaviors are deemed to be anomalous while reducing or eliminating alerts when newly identified normal behaviors are encountered. Specifically, the figure presents one embodiment of certain steps and/or operations that facilitate zone-based analysis of system metric observations to determine one or more zone definitions. Updated or "learned" zone definitions are accessed for later zone-based analyses.

As described above, system observations that correspond to the computing system metrics are received (step 230). Some or all of the system observations are analyzed in accordance with learning analysis (e.g., as provided by the learning analyzers of FIG. 1B). A set of learning rules can be applied to the learning analysis to determine one or more learning system commands. Based on execution of any determined learning system commands (e.g., commands carried out by the zone-based learning system 120) the zone definitions might be updated to reflect newly identified normal behavior.

Figure 3A:
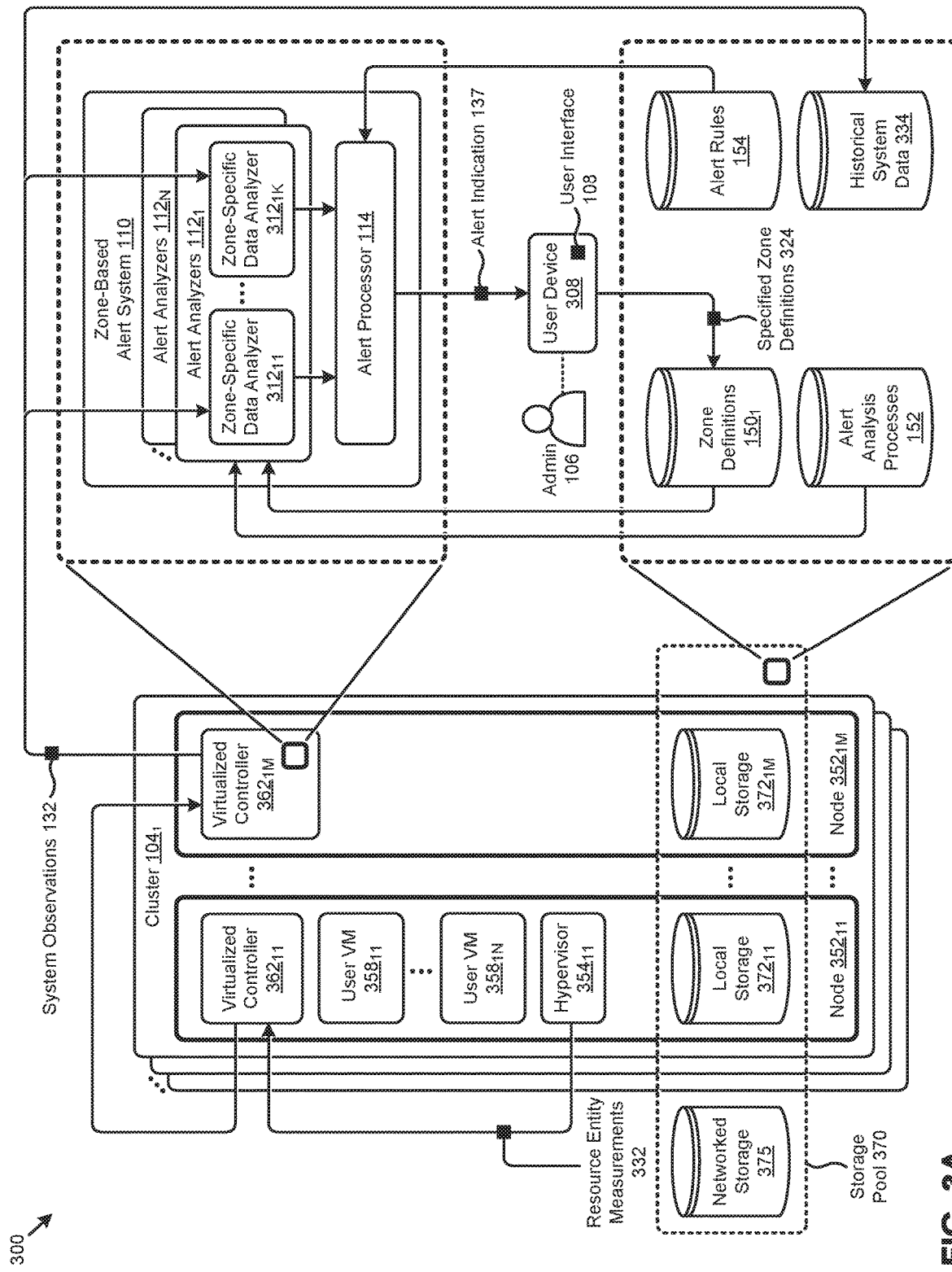
FIG. 3A and FIG. 3B illustrate a computing system for performing multi-zoned analysis of computing system metrics, according to an embodiment.
Figure 3B:
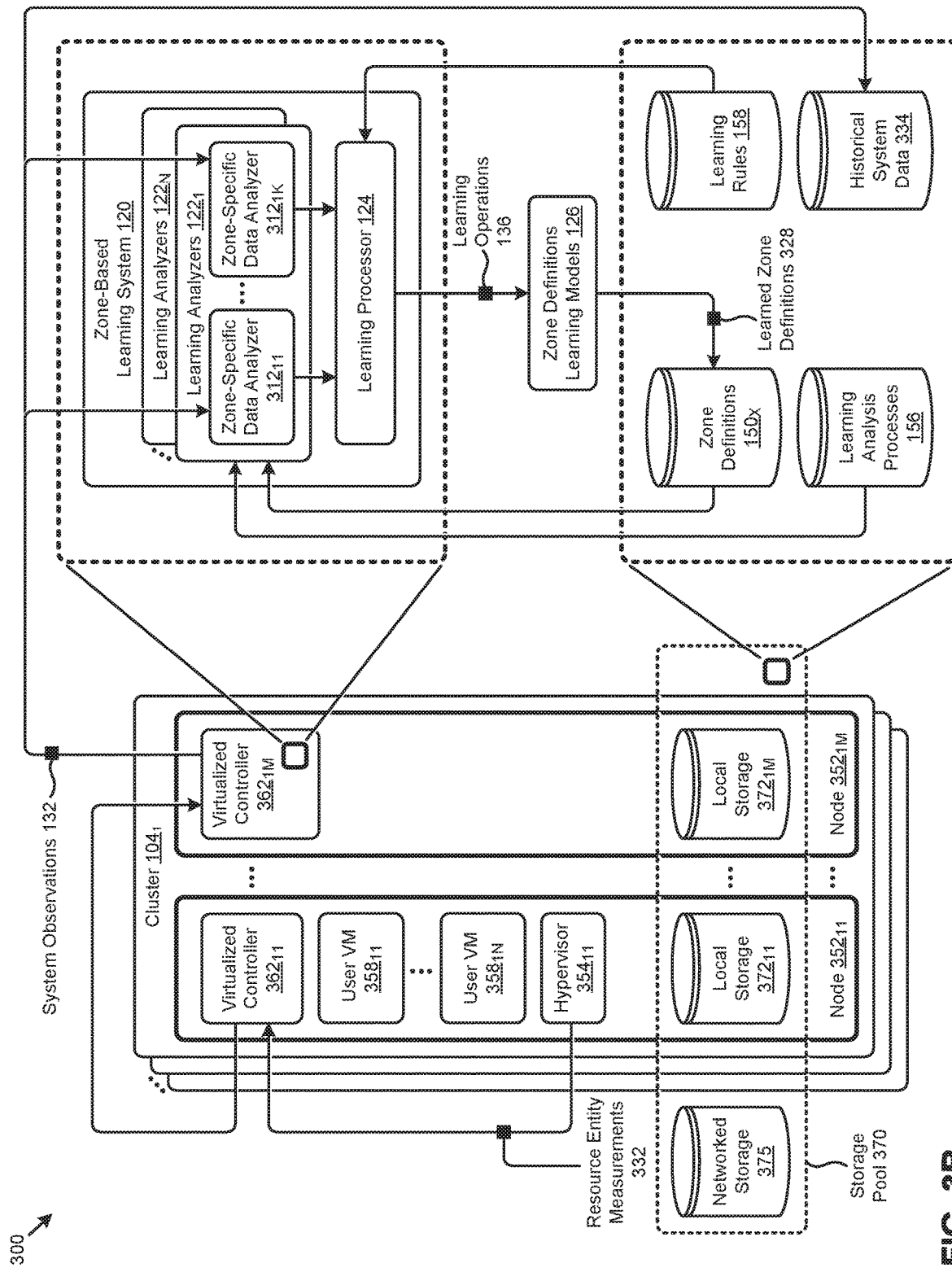

One embodiment of a system for implementing multi-zoned computing system monitoring is disclosed as pertains to FIG. 3A and FIG. 3B.

FIG. 3A and FIG. 3B illustrate a computing system 300 for performing multi-zoned analysis of computing system metrics. As an option, one or more variations of computing system 300 or any aspect thereof may be implemented in the context of the architecture and functionality of the embodiments described herein. The computing system 300 or any aspect thereof may be implemented in any environment.

FIG. 3A and FIG. 3B illustrate aspects pertaining to partitioning computing system metric observation spaces into multiple zones that are associated with respective analysis mechanisms to track system behaviors and raise alerts when behaviors are deemed to be anomalous. Specifically, the figures are being presented to show partitioning and connectivity between certain representative components of computing system 300. The shown partitioning and data flows illustrate how the herein disclosed techniques might be implemented in a modern computing system. The specific components and specific data flows shown in FIG. 3A and FIG. 3B are merely examples. Other partitioning of subsystems and/or other data communication techniques are possible.

As shown in FIG. 3A, the computing system 300 comprises multiple clusters (e.g., cluster $104_1$, etc.) comprising multiple nodes that have multiple tiers of storage in a storage pool. Representative nodes (e.g., node $352_{11}$, . . . , node $352_{1M}$) and storage pool 370 associated with cluster $104_1$ are shown. Each node can be associated with one server, multiple servers, or portions of a server. The nodes can be associated (e.g., logically and/or physically) with the clusters. As shown, the multiple tiers of storage include storage that is accessible through a network, such as a networked storage 375 (e.g., a storage area network or SAN, network attached storage or NAS, etc.). The multiple tiers of storage further include instances of local storage (e.g., local storage $372_{11}$, . . . , local storage $372_{1M}$). For example, the local storage can be within or directly attached to a server and/or appliance associated with the nodes. Such local storage can include solid state drives, hard disk drives, and/or other storage devices.

As shown, any of the nodes of the computing system 300 can implement one or more virtualized entities such as virtual machines (e.g., user VM $358_{11}$, . . . , user VM $358_{1N}$) and/or executable containers. The operation of the VMs can be facilitated at least in part by a hypervisor (e.g., hypervisor $354_{11}$), which hypervisor is logically located between the various guest operating systems of the VMs and the host operating system of the physical infrastructure (e.g., node $352_{11}$). One or more of the virtualized entities at a node can be configured as a virtualized controller (e.g., virtualized controller $362_{11}$, virtualized controller $362_{1M}$). Multiple instances of such virtualized controllers can coordinate within a cluster to manage access to the storage pool 370, among other operations.

As an example, to facilitate the implementation of the herein disclosed techniques in computing system 300, virtualized controller $362_{11}$ at node $352_{11}$ receives a stream of resource entity measurements 332 from hypervisor $354_{11}$. The resource entity measurements 332 are fine-grained measurements or observations pertaining to the resource entities (e.g., CPU, memory, storage, network connections, etc.) of node $352_{11}$. The resource entity measurements 332 are sent to virtualized controller $362_{1M}$. The virtualized controller $362_{1M}$ might be designated as a central access point of cluster $104_1$. In this case, virtualized controller $362_{1M}$ might receive resource entity measurements from all nodes in cluster $104_1$ and/or from other nodes of other clusters in computing system 300. As such, virtualized controller $362_{1M}$ manages the system observations 132 which comprise, for example, the resource entity measurements over all of computing system 300. In some cases, the system observations 132 might be stored in a set of historical system data 334 at storage pool 370.

As can be observed in FIG. 3A, zone-based alert system 110 is also implemented in virtualized controller $362_{1M}$ to facilitate the herein disclosed techniques. The system observations 132 are delivered to the sets of alert analyzers (e.g., alert analyzers $112_1$, . . . , alert analyzers $112_N$) at the zone-based alert system 110. Specifically, the system observations 132 are received at the zone-specific data analyzers (e.g., zone-specific data analyzer $312_{11}$, . . . , zone-specific data analyzer $312_{1K}$) of each set of alert analyzers. The zone-specific data analyzers are associated with a respective analysis zone of a respective computing system metric. As shown, information describing such analysis zones can be stored in a set of zone definitions $150_1$ in storage pool 370. In some cases, an admin 106 can interact with user interface 108 of a user device 308 to specify one or more of the zone definitions (e.g., specified zone definitions 324) stored in zone definitions $150_1$. The zone-specific data analyzers of zone-based alert system 110 are also assigned one or more alert analysis processes, which may be stored in a set of alert analysis processes 152 accessed at storage pool 370.

The zone-specific data analyzers process the system observations in accordance with their assigned alert analysis processes to produce various zone-based analysis outcomes that are consumed by alert processor 114. A set of alert rules 154 are accessed at storage pool 370 and applied to the zone-based analysis outcomes to determine one or more alert operations 134. As an example, such alert operations might emit an alert indication 137 to the user interface 108 of user device 308 for processing by the user interface and/or for viewing by admin 106.

Referring to FIG. 3B, computing system 300 may further comprise a zone-based learning system 120 implemented at virtualized controller $362_{1M}$. As earlier described, virtualized controller $362_{1M}$ might be a centralized access point associated with multiple nodes (e.g., node $352_{11}$, . . . , node $352_{1M}$) of multiple clusters (e.g., cluster $104_1$, etc.). As such, virtualized controller $362_{1M}$ manages the system observations 132 which comprise, for example, the resource entity measurements (e.g., resource entity measurements 332 from hypervisor $354_{11}$ and virtualized controller $362_{11}$) for all of the resource entities (e.g., user VM $358_{11}$, . . . , user VM $358_{1N}$) included in computing system 300. In some cases, the system observations 132 might be stored in a set of historical system data 334 at storage pool 370. The historical system data 334 and/or other data might be distributed over storage pool 370 in a set of local storage (e.g., local storage $372_{11}$, . . . , local storage $372_{11}$) or various networked storage (e.g., networked storage 375).

Sets of learning analyzers (e.g., learning analyzers $122_1$, . . . , learning analyzers $122_N$) at zone-based learning system 120 can receive the system observations 132 from virtualized controller $362_{1M}$. Specifically, the system observations 132 are received at the zone-specific data analyzers (e.g., zone-specific data analyzer $312_{11}$, . . . , zone-specific data analyzer $312_{1K}$) of each set of learning analyzers. The zone-specific data analyzers are associated with a respective analysis zone of a respective computing system metric. Information defining such analysis zones can be stored in a set of zone definitions $150x$ in storage pool 370. As illustrated, at least a portion of the zone definitions $150x$ can comprise a set of learned zone definitions 328 that are derived from one or more zone definition learning models.

Such learning models are embodiments of computing techniques that facilitate determining (e.g., predicting) a set of outputs (e.g., predicted outcomes, predicted responses) based on a set of inputs (e.g., stimuli). In some cases, the techniques implemented by the model might comprise a set of equations having coefficients that relate one or more of the input variables to one or more of the output variables. In these cases, the equations and coefficients can be determined by a training process. For example, zone definitions learning models 126 might consume inputs from a training data set to form a predicter that satisfies particular precision and recall objectives.

Returning again to the discussion of the zone-based learning system 120, the zone-specific data analyzers process the system observations in accordance with their assigned learning analysis processes so as to produce various zone-based analysis outcomes that are in turn consumed by learning processor 124. A set of learning rules 158 are accessed at storage pool 370 and applied to the zone-based analysis outcomes to determine one or more learning operations 136. The learning operations 136 can comprise one or more instructions for forming and maintaining the zone definitions learning models 126. As an example, some learning operations might be invoked to apply updates to a training data set, and/or some learning operations might comprise instructions to relearn one or more of the zone definitions based at least in part on updated training data (e.g., as might be updated based on system configuration changes). Maintaining zone definitions over time is further discussed as pertains to FIG. 6A The foregoing discussions include techniques for analyzing system observations in accordance with zone-specific alert processes (e.g., as depicted in step 241, step 242, step 243, and step 244 of FIG. 2), which techniques are disclosed in further detail as follows.

FIG. 4A1 depicts a zone-based analysis technique 4A100 as implemented in systems that facilitate multi-zoned analysis of computing system metrics. As an option, one or more variations of zone-based analysis technique 4A100 or any aspect thereof may be implemented in the context of the architecture and functionality of the embodiments described herein. The zone-based analysis technique 4A100 or any aspect thereof may be implemented in any environment.

FIG. 4A1 illustrates one aspect pertaining to partitioning computing system metric observation spaces into multiple zones that are associated with respective analysis mechanisms to track system behaviors and raise alerts when behaviors are deemed to be anomalous. Specifically, the figure is being presented to illustrate one context and one embodiment of certain steps and/or operations performed by a representative set of alert analyzers (e.g., alert analyzers $112_1$). As shown in the figure, the steps and/or operations performed by each of the zone-specific data analyzers (e.g., zone-specific data analyzer $312_{11}$, zone-specific data analyzer $312_{12}$, and zone-specific data analyzer $312_{13}$) that constitute the alert analyzers $112_1$ can vary by zone (e.g., based on the zone definitions $150_1$) and by the characteristics of processing (e.g., alert analysis processes 152) performed by the analyzers. In particular, and as shown, step 162 determines the zone corresponding to an incoming metric value. Based on the value as used in combination with zone definitions $150_1$, a zone processing path is selected. Specifically, and as shown, switch 163 serves to select a path (e.g., the shown zone Z1 path, zone Z2 path, or zone Z3 path). The selected path is taken. The paths lead to different analyses based on the zone.

When the zone Z1 path is taken, the steps and/or operations performed at zone-specific data analyzer $312_{11}$ can commence with accessing an alert analysis process assigned to a first analysis zone to analyze one or more system observations (step 412). The first analysis zone might be defined in the zone definitions $150_1$, and the assigned alert analysis processes might be selected from the alert analysis processes 152. The system metric value 133 might be extracted from the portion of the system observations that pertain to the metric observation space that contains the first analysis zone. In response to the foregoing analysis, certain data (e.g., alert data) is delivered that describes an analysis outcome for the first analysis zone (step 414).

When the zone Z2 path is taken, the steps and/or operations performed at zone-specific data analyzer $312_{12}$ can commence with accessing at least a first one of a plurality of alert analysis process assigned to a second analysis zone to analyze one or more system observations (step 422). Results from processing the first one of a plurality of alert analysis process might be dispositive, or might not be dispositive. Furthermore, in some cases, results from two or more different analysis processes assigned to the same zone might need to be reconciled. One technique for reconciling results from a plurality of alert analysis process is shown and described as pertains to FIG. 4A2.

Continuing the discussion of step 422, the second analysis zone might be defined in the zone definitions $150_1$, and the assigned alert analysis processes might be selected from the alert analysis processes 152. The system metric value 133 might be extracted from the portion of the system observations that pertain to the metric observation space that contains the second analysis zone. In response to the foregoing analysis, certain data (e.g., alert data) is delivered that describes an analysis outcome for the second analysis zone (step 423).

In the specific case of zone Z3 analysis, where observations in that zone are deemed to be normal, the zone-specific data analyzer $312_{13}$ can be configured to perform no operations (NOP) and thus, the shown example zone-specific data analyzer $312_{13}$ merely ignores the occurrence (step 432).

The depiction of FIG. 4A1 includes three zones. However more zones are possible. It is also possible that no alert analysis process is assigned to a particular subject analysis zone, but rather, in place of an alert analysis process, occurrences into that zone are used merely for tracking a number or frequency of occurrences in that zone. Such tracking can be used for ongoing error analysis and/or for tuning components of the observation monitoring system (e.g., monitor 103 of FIG. 1A).

The steps and/or operations performed at zone-specific data analyzer $312_{12}$ might involve multiple alert analyses. Such a case is shown and described as pertains to FIG. 4A2.

FIG. 4A2, depicts the steps and/or operations within step 422 of zone-specific data analyzer $312_{12}$. The shown flow commences with accessing a first alert analysis process of the plurality of alert processes assigned to the second zone (step 421). As an example, the first alert analysis process might be based on techniques that are known or predicted to quickly produce a result using only a limited amount of computing resources (e.g., fast rule-based analysis). A simple rule that compares a system observation value to a threshold value might have characteristics of being fast and/or of using only a limited amount of computing resources to produce a result. However, in many situations, the aforementioned simple rules and/or simple comparisons might not be dispositive. For example, if the comparison difference is small relative to the noise level inherent in the observation, then further analysis might need to be performed (see "Yes" path of decision 424) and, if so, then a second alert analysis process assigned to the second analysis zone is accessed to analyze the system observations (step 426). In some cases, the second alert analysis process might have a predictably higher cost (e.g., a higher level of computing resource usage) than the first alert analysis process, however the second alert analysis process might still be invoked—even at higher computing resource costs—whenever a more accurate and/or precise analysis as compared to the first alert analysis process is deemed to be needed.

Strictly as one example scenario, if the first alert analysis process had indicated that an alert should be emitted (e.g., based on, for example, a high value in zone Z2), but the high value is associated with a particular metric that is associated with a large measurement error, then a second alert analysis process might be invoked to look back through history logs to identify if that high value had been periodically occurring. In some cases, a periodically re-occurring high value, after which there are no ill effects, might be considered to be normal periodic behavior and no alert, or a different alert, might be emitted. In another situation, if after looking back through history logs, it is found that the high value had not been periodically occurring, then the current occurrence of the high value might be deemed to be either spurious, or transient, or for any other reason wrong (e.g., due to measurement conditions), then the current high value might be ignored.

In most cases, the first analysis results might be different from the second analysis results and, as such, at step 428 the differing results are reconciled so as to select (at decision 429) one or the other results (e.g., when one is deemed more reliable than another) or both (e.g., when the results, although different, are not repugnant to each other). The reconciliation might result in a determination to use the first analysis results (step 430), or the reconciliation might result in a determination to use the second analysis results (step 431). In the cases when the results are not repugnant to each other (e.g., when step 428 confirms the validity of both results), both results can be used in further processing. As such, both results might be used when the second analysis results are additive to the first analysis results. Strictly as one example, a first analysis might report a simple Boolean value with respect to the comparison, while the second analysis might further report a frequency of occurrence of the observation and/or a statistical confidence measure. In any of the foregoing cases, step 433 serves to deliver at least one analysis outcome to a caller (e.g., for use by downstream processes).

The foregoing discussions pertaining to FIG. 4A1 and FIG. 4A2 include techniques for associating zone definitions and analysis processes to various analysis zones of metric observation spaces, which techniques are disclosed in further detail as follows.

Figure 4B:
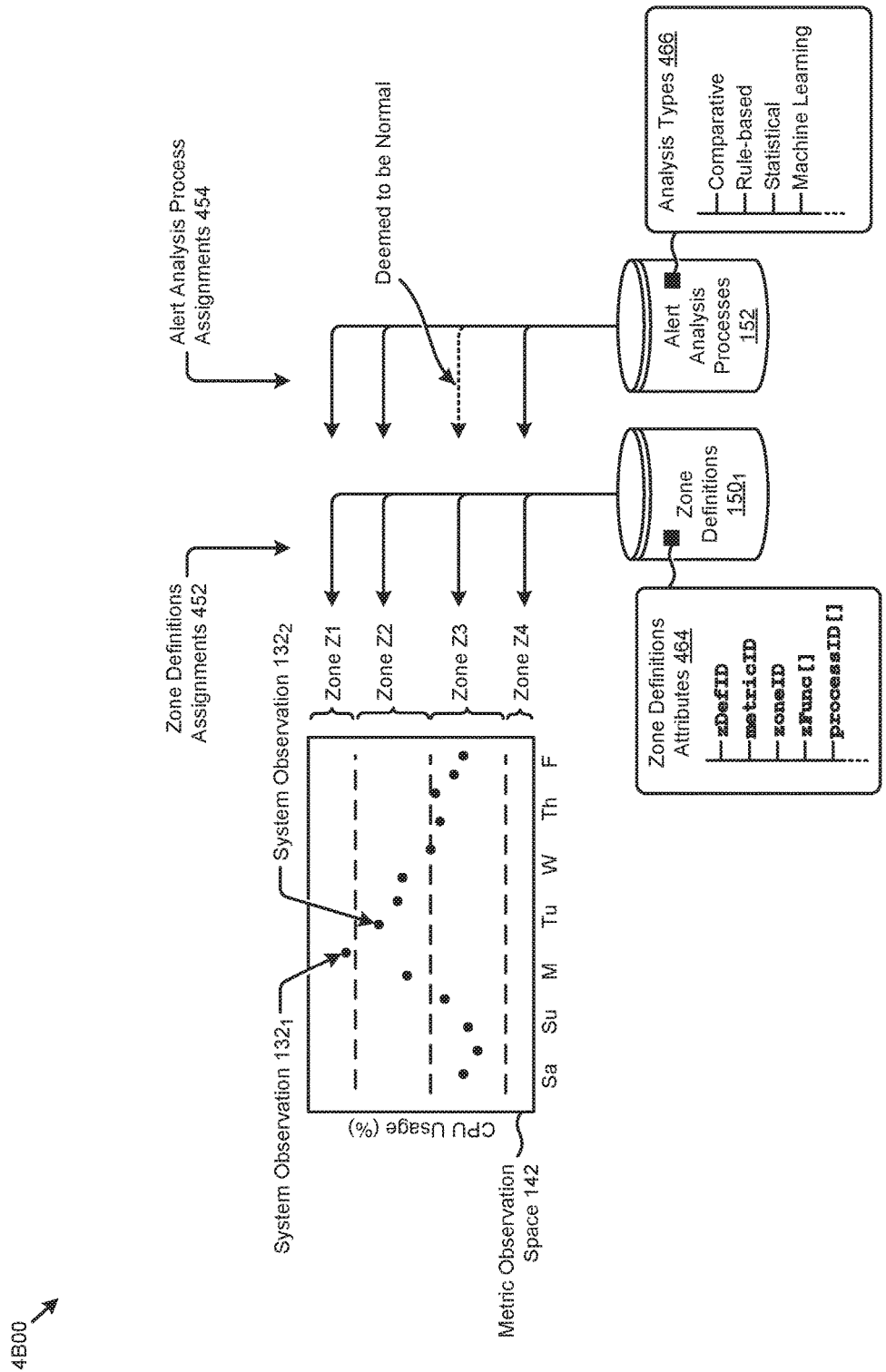
FIG. 4B illustrates a metric observation space partitioning scenario that occurs in systems that perform multi-zoned analysis of computing system metrics, according to an embodiment.

FIG. 4B illustrates a metric observation space partitioning scenario 4B00 that occurs in systems that perform multi-zoned analysis of computing system metrics. As an option, one or more variations of metric observation space partitioning scenario 4B00 or any aspect thereof may be implemented in the context of the architecture and functionality of the embodiments described herein. The metric observation space partitioning scenario 4B00 or any aspect thereof may be implemented in any environment.

FIG. 4B illustrates one aspect pertaining to partitioning computing system metric observation spaces into multiple zones that are associated with respective analysis mechanisms to track system behaviors and raise alerts when behaviors are deemed to be anomalous. Specifically, the figure is being presented to illustrate the mapping (e.g., assignment) of zone definitions and/or alert analysis processes to the analysis zones of metric observation spaces.

As shown in FIG. 4B, the metric observation space 142 is partitioned into four analysis zones (e.g., zone Z1, zone Z2, zone Z3, and zone Z4). A set of zone definitions assignments 452 assign certain zone definitions from zone definitions $150_1$ so as to configure the characteristics of the four analysis zones. For example, in the two-dimensional space of metric observation space 142, the zone definitions might comprise a zone function that defines the boundaries of the analysis zones. More specifically, all of the analysis zones of metric observation space 142 are defined by at least one zone function that is graphed as a horizontal line (e.g., y=C, where C is a constant value). Zone Z2 and zone Z3 are further defined respective zone functions. A zone function can be defined as a discrete piecewise linear function (e.g., ordinate y=C1 for abscissa x={Sa, Su}, ordinate y=C2 for abscissa x={M, Tu, W}, and ordinate y=C3 for abscissa x={Th, F}). Other discrete, and/or continuous, and/or piecewise functions are possible. Multiple functions can be combined so as to result in, for example, a first region that is represented as a series of piecewise linear functions, and a second region that is represented as a continuous function.

The zone definitions $150_1$ and/or any other data described herein can be organized and/or stored using various techniques. For example, the zone definitions attributes 464 associated with zone definitions $150_1$ indicate that the zone definitions might be organized and/or stored in a tabular structure (e.g., relational database table) that has rows that relate various user attributes with a particular zone definition. As another example, the information might be organized and/or stored in a programming code object that has instances corresponding to a particular zone definition and properties corresponding to the various attributes associated with the particular zone definition. As depicted in zone definitions attributes 464, a data record (e.g., table row or object instance) for a particular zone definition might describe a zone definition identifier (e.g., stored in a "zDe-fID" field), a metric identifier (e.g., stored in a "metricID" field), a zone identifier (e.g., stored in a "zone ID" field), a list of zone functions that characterize the analysis zone (e.g., stored in a "zFunc[ ]" object), a list of alert analysis process identifiers assigned to the analysis zone (e.g., stored in an "processID[ ]" object), and/or other zone definitions attributes.

A set of alert analysis process assignments 454 assign certain instances of alert analysis processes 152 to the analysis zones of metric observation space 142 so as to facilitate zone-based analysis of system observations. For example, a system observation $132_1$ will be analyzed according to the one or more alert analysis processes assigned to zone Z1 of metric observation space 142. As another example, a system observation $132_2$ will be analyzed according to the one or more alert analysis processes assigned to zone Z2 of metric observation space 142. As depicted in a representative set of analysis types 466, the alert analysis processes 152 might perform analyses of a comparative type (e.g., a threshold comparator), a rule-based type (e.g., a rule-based logic function), a statistical type (e.g., an anomaly detector), a machine learning type, and/or of another analysis type.

The foregoing discussions include techniques for applying alert rules to zone-based analysis outcomes to determine and execute alert operations (e.g., step 252 and step 256 of FIG. 2), which techniques are disclosed in further detail as follows.

Figure 5:
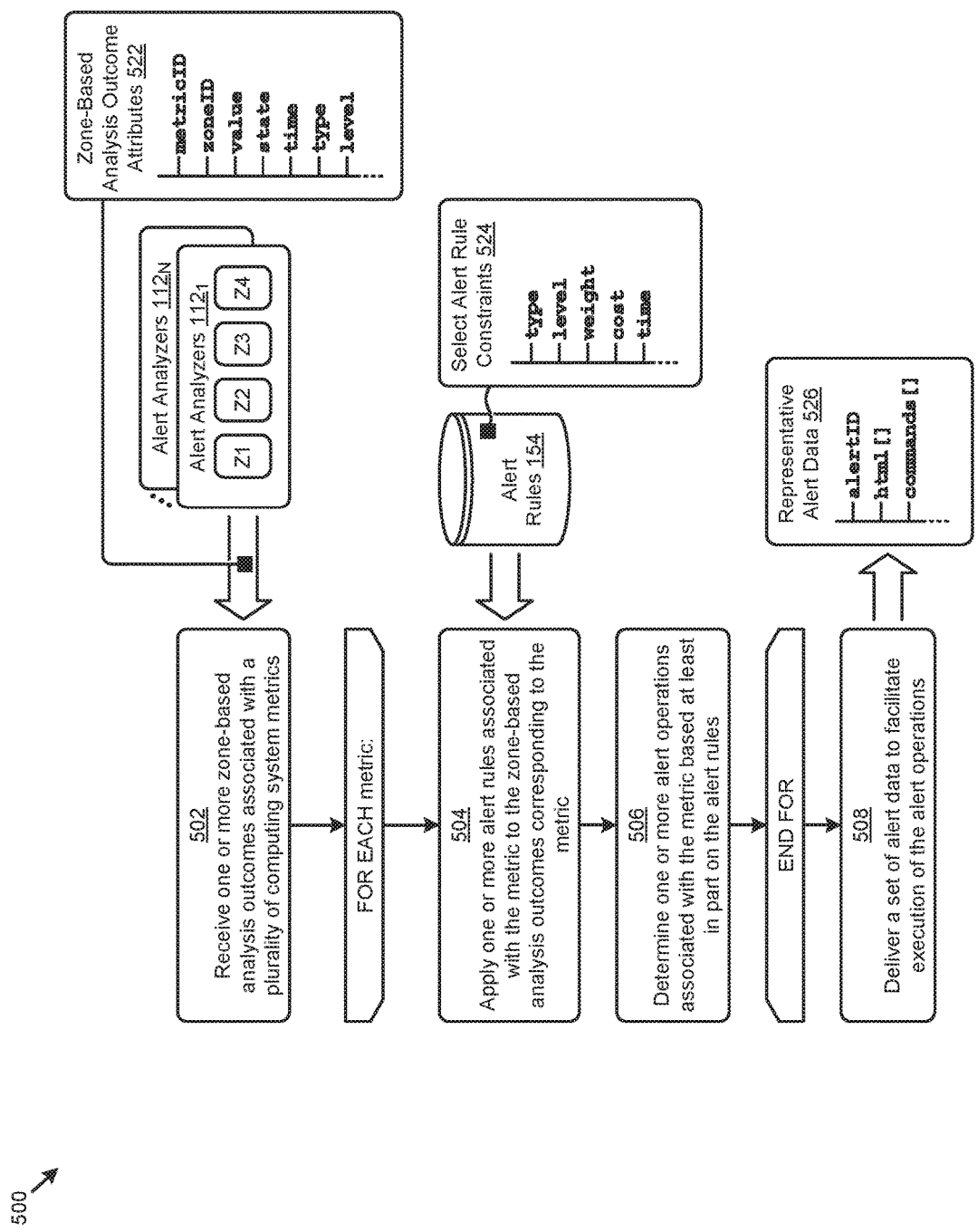
FIG. 5 presents a system monitoring rule application technique as implemented in systems that facilitate multi-zoned analysis of computing system metrics, according to an embodiment.

FIG. 5 presents a system monitoring rule application technique 500 as implemented in systems that facilitate multi-zoned analysis of computing system metrics. As an option, one or more variations of system monitoring rule application technique 500 or any aspect thereof may be implemented in the context of the architecture and functionality of the embodiments described herein. The system monitoring rule application technique 500 or any aspect thereof may be implemented in any environment.

FIG. 5 illustrates one aspect pertaining to partitioning computing system metric observation spaces into multiple zones that are associated with respective analysis mechanisms to track system behaviors and raise alerts when behaviors are deemed to be anomalous. Specifically, the figure presents one embodiment of certain steps and/or operations that facilitate applying alert rules to zone-based analysis outcomes to determine and execute alert operations.

The system monitoring rule application technique 500 can commence by receiving one or more zone-based analysis outcomes associated with a plurality of computing system metrics (step 502). As illustrated, such zone-based analysis outcomes might be received from various sets of alert analyzers, such as alert analyzers $112_1$ through alert analyzers $112_N$. Zone-based analysis outcome attributes 522 indicates that a data record (e.g., table row or object instance) for a particular zone-based analysis outcome might describe a metric identifier (e.g., stored in a "metricID" field), a zone identifier (e.g., stored in a "zone ID" field), an observation value (e.g., stored in a "value" field), an alert state (e.g., "true" or "false" stored in a "state" field), a timestamp associated with the outcome (e.g., stored in a "time" field), an alert type (e.g., "display" or "recommend" or "mitigate" stored in a "type" field), an alert level (e.g., "warning" or "severe" stored in a "level" field), and/or other zone-based analysis outcome attributes.

For each metric of the plurality of computing system metrics, one or more alert rules associated with the metric are applied to the zone-based analysis outcomes corresponding to the metric (step 504). For example, the one or more alert rules might be selected from the alert rules 154. One or more alert operations associated with the metric are then determined based at least in part on the alert rules (step 506). A set of rules (e.g., rule base) such as alert rules 154 or any other rules described herein, comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. As shown in a set of select alert rule constraints 524, aspects pertaining to the "type", "level", "weight", "cost", and "time" or other parameters of the zone-based analysis outcomes might be considered when determining the alert operations.

When the alert operations for all analysis zones of all computing system metrics are determined, a set of alert data is delivered to facilitate the execution of the alert operations (step 508). As indicated in a set of representative alert data 526, a data record (e.g., table row or object instance) for a particular instance of alert data might describe an alert identifier (e.g., stored in an "alertID" field), a set of HTML code for displaying alerts (e.g., stored in an "html [ ]" object), a list of commands for executing alert operations (e.g., stored in a "command [ ]" object), and/or other alert data attributes.

The foregoing discussions include techniques for analyzing system observations in accordance with zone-specific learning processes to determine and execute learning operations which techniques are disclosed in further detail as follows.

Figure 6A:
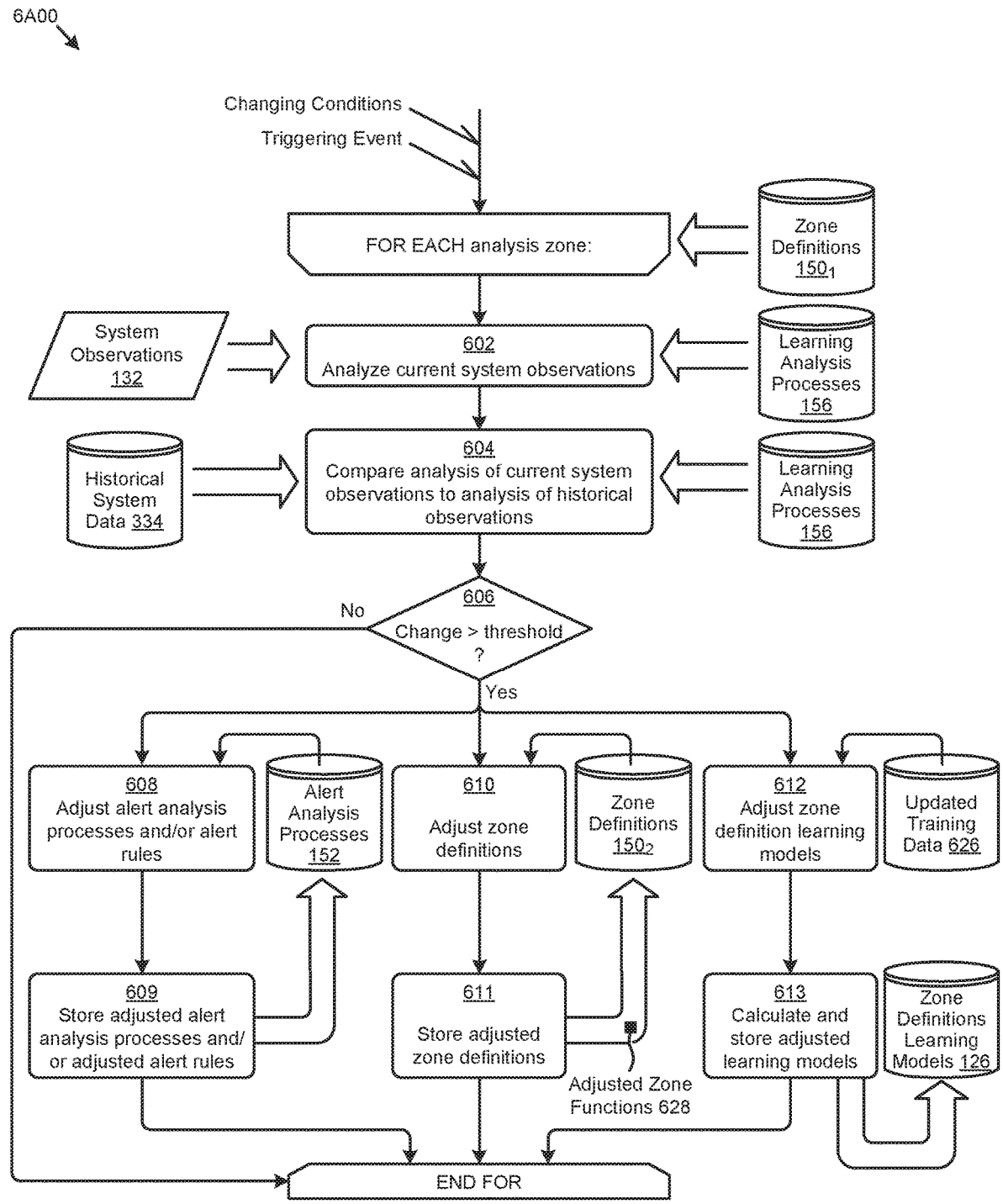
FIG. 6A presents a zone maintenance technique as implemented in systems that facilitate multi-zoned analysis of computing system metrics, according to an embodiment.

FIG. 6A presents a zone maintenance technique 6A00 as implemented in systems that facilitate multi-zoned analysis of computing system metrics. As an option, one or more variations of zone maintenance technique 6A00 or any aspect thereof may be implemented in the context of the architecture and functionality of the embodiments described herein.

The zone maintenance techniques described hereunder facilitate long term accuracy in the data structures and processes that are used in issuing alerts. Specifically, over time (e.g., over weeks or months or more), a system might undergo ongoing system configuration changes (e.g., resulting from installation of additional hardware, and/or resulting from network reconfigurations, and/or for other reasons). While zone definitions and the training data that was used in an initial period to form initial zone definitions and predictors might been deemed to have had sufficiently high accuracy, it can happen that due to the aforementioned ongoing system configuration changes, the data structures and processes might become less able to accurately classify observations into correct zones and issue alerts appropriately. This can be remedied under many circumstances by making adjustments to the data structures and processes so as to account for the ongoing system configuration changes. More specifically, adjustments to the data structures and processes are made to suit the changing conditions (e.g., that may arise from ongoing system configuration changes). The adjustments can result in changes to zone boundary definitions, and/or adjustments to zone analysis processing, and/or the manner of raising or suppressing alerts as well as adjustments to other processes and data structures.

As an example, if the system metric for some type of input/output (TO or I/O) latency decreases over time, such as because a faster network interface was installed, then what was formerly in a normal zone (e.g., normal being in a range 32 mS-40 mS) before the installation of the network interface would need to become anomalous, and a 'new normal zone' definition (e.g., normal being in a range 16 mS-20 mS) would need to be defined.

One mechanism that can be used to account for the ongoing system configuration changes is to adjust the data structures and processes based on new system observations. As such, the zone maintenance technique 6A00 is initiated at some moment after a triggering event. A triggering event can be a detection of a change in system conditions or a change in system configurations such as a change to a hardware configuration or a change to a software configuration. The FOR EACH loop then performs various steps and/or operations for each analysis zone (e.g., as defined by zone definitions $150_1$). Within this loop, one or more learning analysis processes (e.g., from learning analysis processes 156) assigned to the analysis zone are invoked (at step 602) to analyze a set of recent system observations (e.g., a recent set of observations going back to the time of the triggering event). At step 604, historical system data 334 is accessed, and analysis of the recent system observations is compared to an analysis of the historical observations (e.g., historical observations from a period before the triggering event). The analysis for either or both sets of observations might include performing various statistical analyses to determine statistical certainty in the analyzed set of data points and/or to determine trends.

In some cases, an identified trend can be deemed as resulting from one or more ongoing system configuration changes, such as drift resulting from changes to the system hardware and/or software and/or environment. As such, decision 606 serves to steer further processing based on whether or not an ongoing system change is of sufficient impact (e.g., breaching a threshold) to warrant adjustments. If the "Yes" branch of decision 606 is taken, then step 608, step 610 and step 612 are executed in parallel. Each of step 608, step 610 and step 612 can access their respective datasets and consider how to make adjustments. As examples, (1) step 612 to adjust zone definition learning models can access updated training data 626, (2) step 610 to adjust a zone definition can access zone definitions 1502, and (3) step 608 to adjust alert processes and/or alert rules can access alert analysis processes 152.

In the specific case of adjusting zone definition learning models (e.g., corresponding to step 612, updated training data 626 is accessed and used to adjust the predictors. The updated training data might comprise certain sets of recent observations taken from the system observations. In some cases, an adjustment to a predictor is performed using supervised learning. In other cases, an adjustment to a predictor is performed using unsupervised learning. At step 610 system observations are used to derive an adjusted zone functions 628. The adjusted zone functions 628 in turn are codified and stored (at step 611) in zone definitions 1502.

Returning to the foregoing example, if the comparative analysis performed at step 604 resulted in a determination that current observations of I/O latency in the range 32 mS-40 mS are consistent with a trend that is associated with a change in hardware, and furthermore that ongoing observations in the range 32 mS-40 mS are normal then, at step 612, the predictors associated with such I/O latency can be adjusted to codify the range 32 mS-40 mS. Specifically, in this example, the subject predictor is adjusted to consider observations in the range 32 mS-40 mS as normal behavior.

There are many reasons why a system might undergo ongoing system configuration changes such that a system metric that had formerly been classified in a normal range now should become classified in a range other than normal. Table 2 provides additional examples of causes of ongoing system configuration changes together with corresponding triggering events.

TABLE 2

Examples of ongoing system configuration changes

| Triggering Event | Description of Associated Observations |
|---|---|
| Complete an operating system update | New observations of ratio of time in kernel to time in user process drift toward lower values |
| Replace an HDD with an SSD | New observations of storage I/O latency drift toward lower values |
| Add a storage-centric node to the cluster | New observations of network activity for storage I/O drift toward higher values, while new observations of storage I/O latency drift toward lower values |
| Migrate a workload from cluster to cloud | New observations of network I/O drift toward higher values, while new observations of CPU usage drift toward lower values |
| Retire a workload from a cluster | New observations of average CPU utilization drift toward lower values |

As previously mentioned, certain zone definitions might include variance over time, which time variance can be codified as a piecewise linear embodiment of an adjusted zone function, which is stored in shown zone definitions 1502.

After execution of step 608, step 610, and 612 has completed, the results of performance of those steps are stored in respective repositories. As shown, step 609 stores adjusted alert analysis processes and/or adjusted alert analysis rules into the shown repository for alert analysis processes. Also, the results of step 610 are stored at step 611 as adjusted zone definitions in the shown repository for zone definitions, and the results of performance of step 612 are stored at step 613 into the repository for zone definitions learning models.

The FOR EACH loop ends for this analysis zone and other analysis zones are considered.

As earlier indicated, the learning rules can be configured to detect zone overlaps that might occur as a result of the independent nature of the zone-based analyses as described herein. Additionally, the learning rules can identify and/or resolve conflicts that might arise from such zone overlaps.

An example scenario illustrating an adjustment to a zone function according to the herein disclosed techniques is discussed in detail as follows.

Figure 6B:
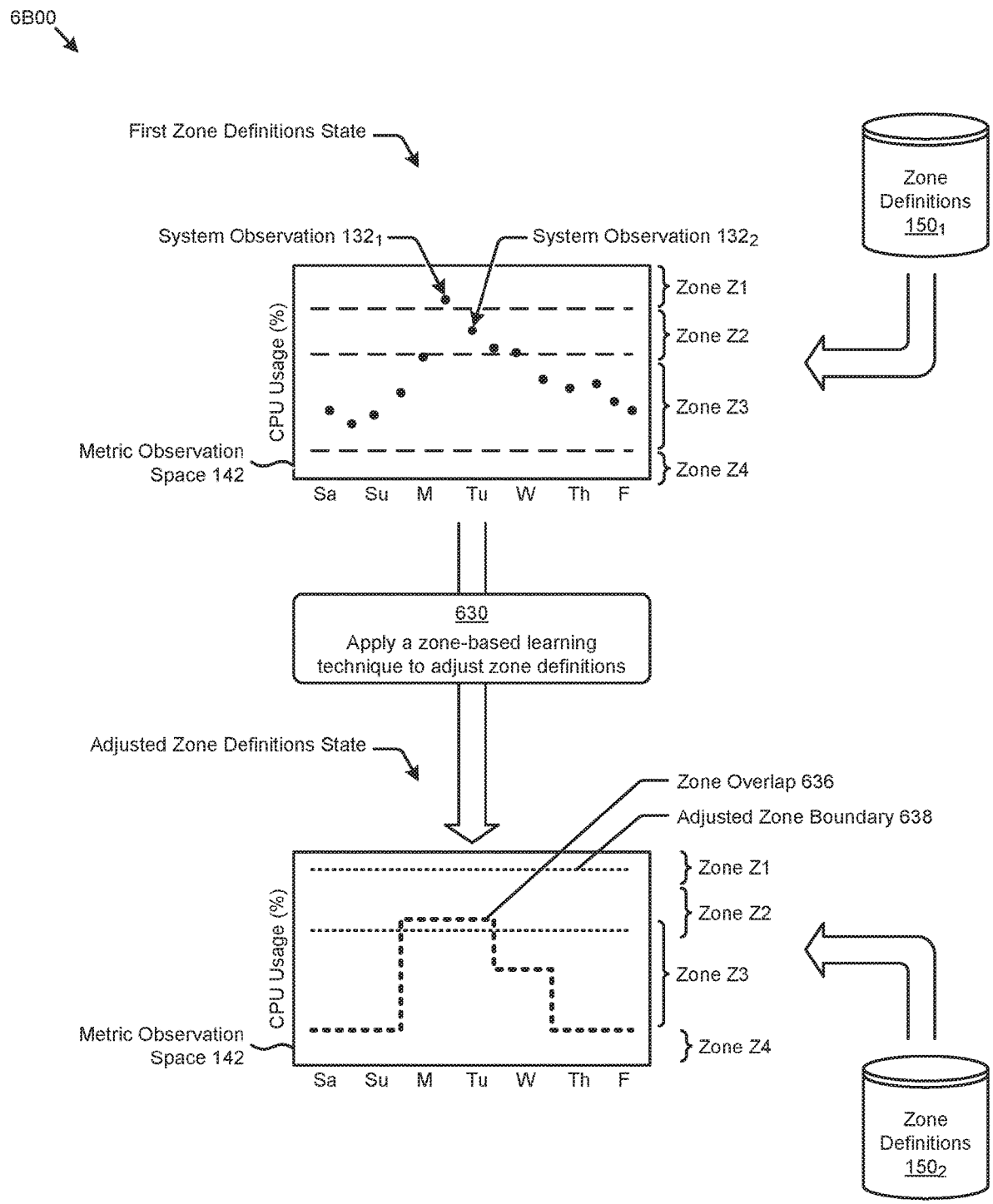
FIG. 6B illustrates a zone definition adjustment scenario as implemented in systems that facilitate multi-zoned analysis of computing system metrics, according to an embodiment.

FIG. 6B illustrates a zone definition adjustment scenario 6B00 as implemented in systems that facilitate multi-zoned analysis of computing system metrics. As an option, one or more variations of zone definitions adjustment scenario 6B00 or any aspect thereof may be implemented in the context of the architecture and functionality of the embodiments described herein. The zone definitions adjustment scenario 6B00 or any aspect thereof may be implemented in any environment.

FIG. 6B illustrates one aspect pertaining to partitioning computing system metric observation spaces into multiple zones that are associated with respective analysis mechanisms to track system behaviors and raise alerts when behaviors are deemed to be anomalous. Specifically, the figure is being presented to illustrate an application of a zone-based learning technique to adjust the zone definitions of analysis zones that comprise various metric observation spaces.

As shown in FIG. 6B, the metric observation space 142 is partitioned into four analysis zones (e.g., zone Z1, zone Z2, zone Z3, and zone Z4) in a first zone definitions state. In this state, the analysis zones are defined by zone definitions $150_1$. At some moment in time, a set of system observations that include system observation $132_1$ and system observation $132_2$ are collected. A zone-based learning technique is applied to the system observations to determine any zone definitions adjustments (operation 630). In this illustrative example, an adjusted zone definition for zone Z1 includes a zone function that defines an adjusted zone boundary 638. This adjusted zone definition is codified in zone definitions 150₂. Also, and as shown in the example, the boundaries for zone Z4 are updated to specify a series of piecewise-linear functions. As can be seen, the boundaries for zone Z4 are adjusted such that the zone boundaries for zone Z4 result in a zone overlap 636.

Such zone overlaps can occur as a result of the independent nature of the zone-based analyses as described herein. Any conflicts (e.g., in zone-based analysis outcomes) arising from such zone overlaps can be handled by one or more rules (e.g., alert rules, learning rules, etc.). In particular, when a particular observation falls within a range of two or more overlapping zones, the processing might include handling the observation independently, once for each zone. For example, a first event might be raised when processing the first of the two or more overlapping zones, while a second, different event might be raised when processing the second of the two or more overlapping zones.

The different ones of the two or more overlapping zones might be associated with respective different event emissions and/or different actions taken and/or different rule-based regimes. As such, there can arise situations where actions taken under the regime of a first zone might be in conflict with the actions taken under the regime of a second zone. For example, the regime of a first zone might specify a rule to "migrate the VM to another machine", whereas the regime of a second zone might specify a rule to "authorize additional resource the VM on this machine". Inasmuch as such regimes and/or rules are wholly or partially in conflict, one or another set of actions can be taken after first considering which portions of the regimes and/or rules are in conflict, then applying scores or weights to resolve the conflicts. Weights can be used in combination with scoring techniques, which scoring techniques can include any techniques for historical correlation, and/or statistical confidence measures, and/or distance calculations, etc.

Additional Embodiments of the Disclosure

Additional Practical Application Examples

Figure 7A:
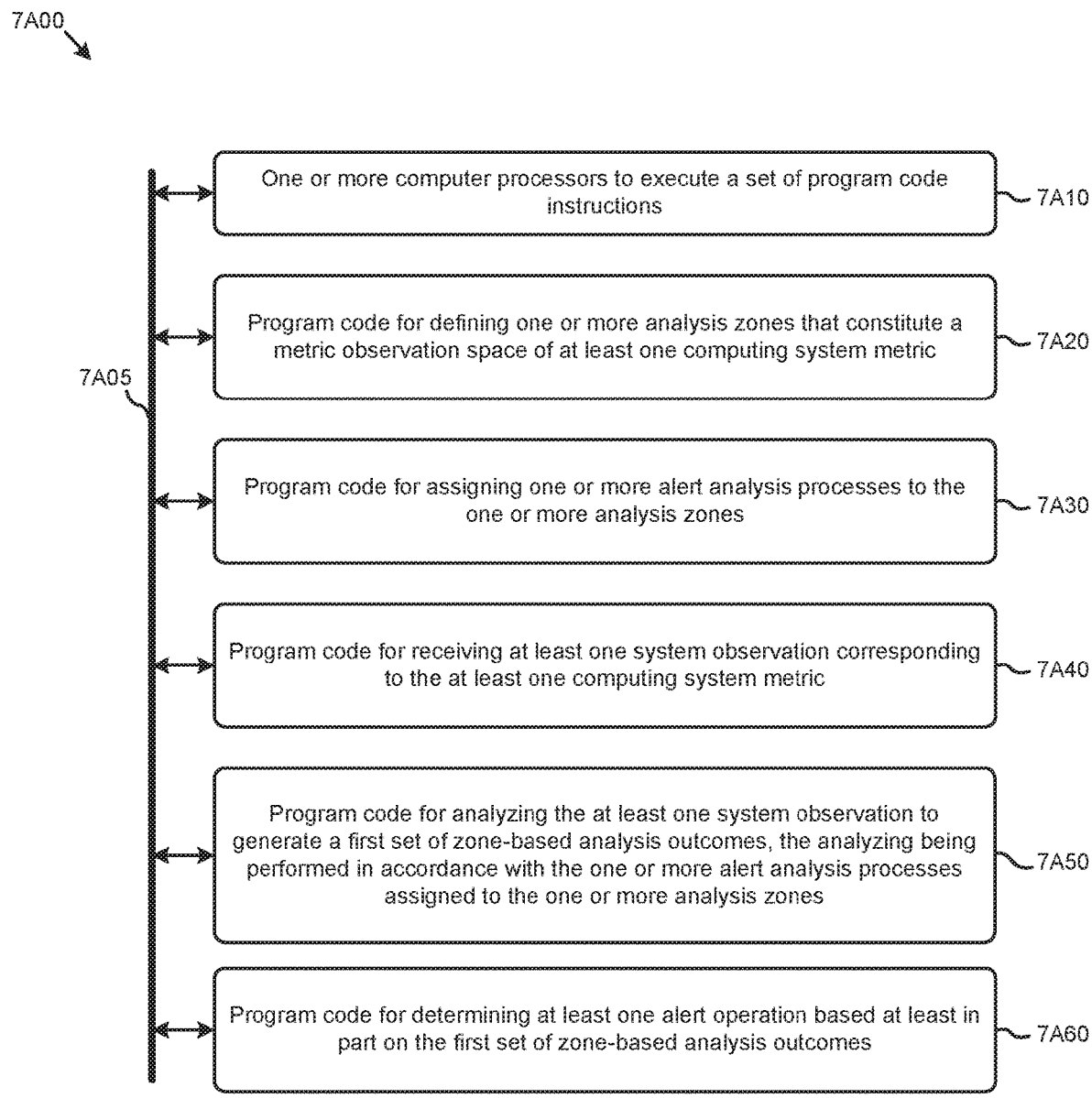
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually and/or as combined, serve to form improved technological processes that address providing accurate and meaningful system behavior alerts in highly dynamic computing systems. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: defining one or more analysis zones that constitute a metric observation space of at least one computing system metric (module 7A20); assigning one or more alert analysis processes to the one or more analysis zones (module 7A30); receiving at least one system observation corresponding to the at least one computing system metric (module 7A40); analyzing the at least one system observation to generate a first set of zone-based analysis outcomes, the analyzing being performed in accordance with the one or more alert analysis processes assigned to the one or more analysis zones (module 7A50); and determining at least one alert operation based at least in part on the first set of zone-based analysis outcomes (module 7A60).

Variations of the foregoing may include more or fewer of the shown modules. Certain variations may perform more or fewer (or different) steps and/or certain variations may use data elements in more or in fewer (or different) operations. As examples, in some embodiments, the determining of the at least one alert operation comprises applying one or more alert rules to the first set of zone-based analysis outcomes. In some embodiments, the one or more analysis zones are defined at least in part by one or more manually-generated zone definitions. Or, in some cases, the alert analysis processes comprise one or more threshold comparators, and/or one or more sets of rule-based logic, and/or one or more anomaly detectors, and/or one or more statistical models, and/or one or more predictive models. In some cases, an alert operation comprises combinations of, issuing an alert, issuing a recommendation, or invoking a mitigation operation.

Some embodiments include additional operations. Strictly as an example, additional operations might include assigning one or more learning analysis processes to one or more analysis zones, then analyzing system observations to generate a second set of zone-based analysis outcomes, the analyzing being performed in accordance with the one or more learning analysis processes assigned to the one or more analysis zones, and determining learning operations based at least in part on the second set of zone-based analysis outcomes. The determining of the learning operation might include applying one or more learning rules to the first set of zone-based analysis outcomes, some of which in turn can be used to produce updated zone definitions and/or to generate learning system commands. Such commands can invoke learning operations such as updating a training data set, or invoking a rebuild of one or more zone definitions learning models, etc. Still further, some embodiments include variations in the operations performed, and some embodiments include variations of aspects of the data elements used in the operations.

Figure 7B:
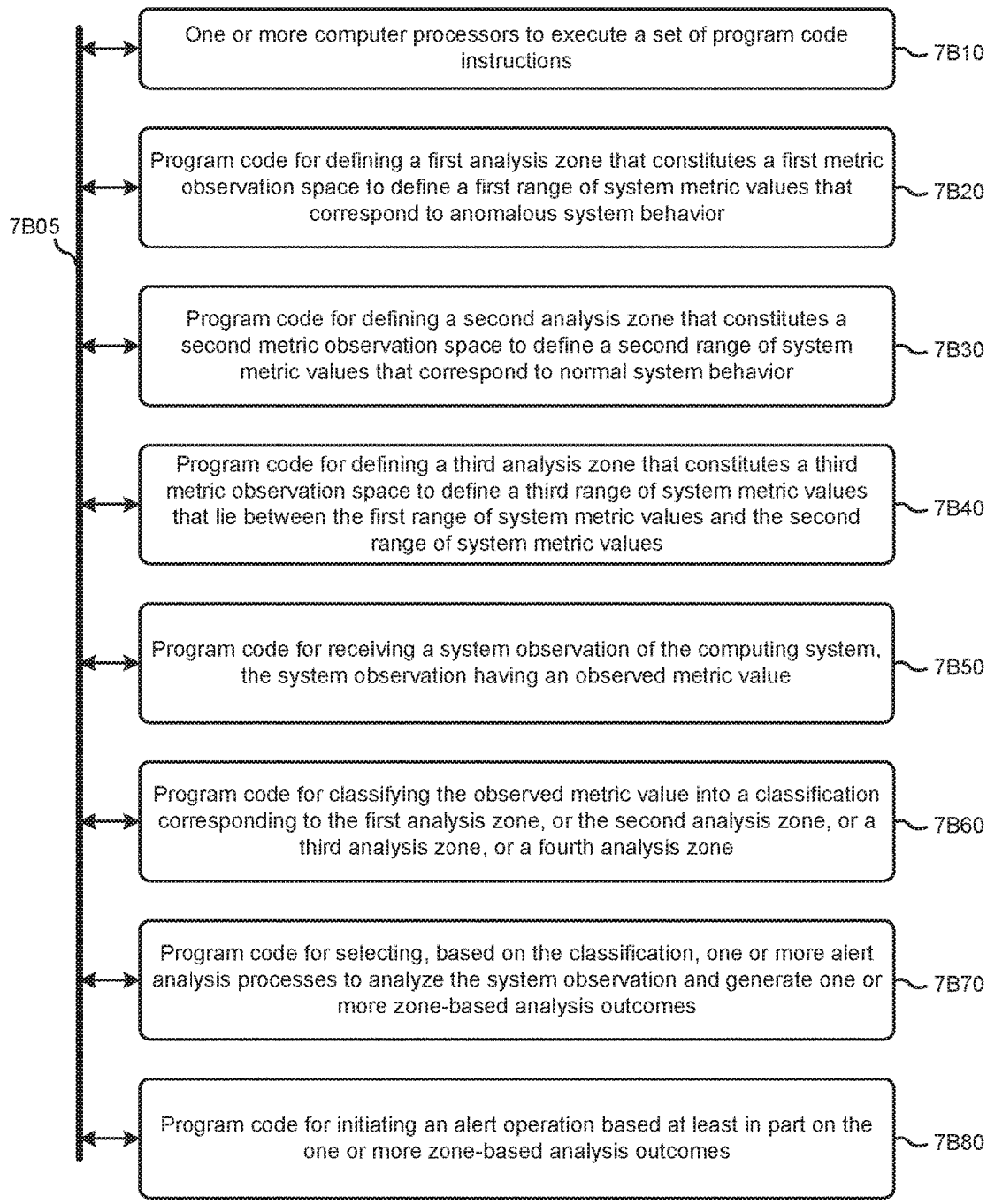

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising one or more computer processors to execute a set of program code instructions (module 7B10) and modules for accessing memory to hold program code instructions to perform: defining a first analysis zone that constitutes a first metric observation space to define a first range of system metric values that correspond to anomalous system behavior (module 7B20); defining a second analysis zone that constitutes a second metric observation space to define a second range of system metric values that correspond to normal system behavior (module 7B30); defining a third analysis zone that constitutes a third metric observation space to define a third range of system metric values that lie between the first range of system metric values and the second range of system metric values (module 7B40); receiving a system observation of the computing system, the system observation having an observed metric value (module 7B50); classifying the observed metric value into a classification corresponding to the first analysis zone, or the second analysis zone, or a third analysis zone, or a fourth analysis zone (module 7B60); selecting, based on the classification, one or more alert analysis processes to analyze the system observation and generate one or more zone-based analysis outcomes (module 7B70); and initiating an alert operation based at least in part on the one or more zone-based analysis outcomes (module 7B80).

System Architecture Overview

Additional System Architecture Examples

Figure 8A:
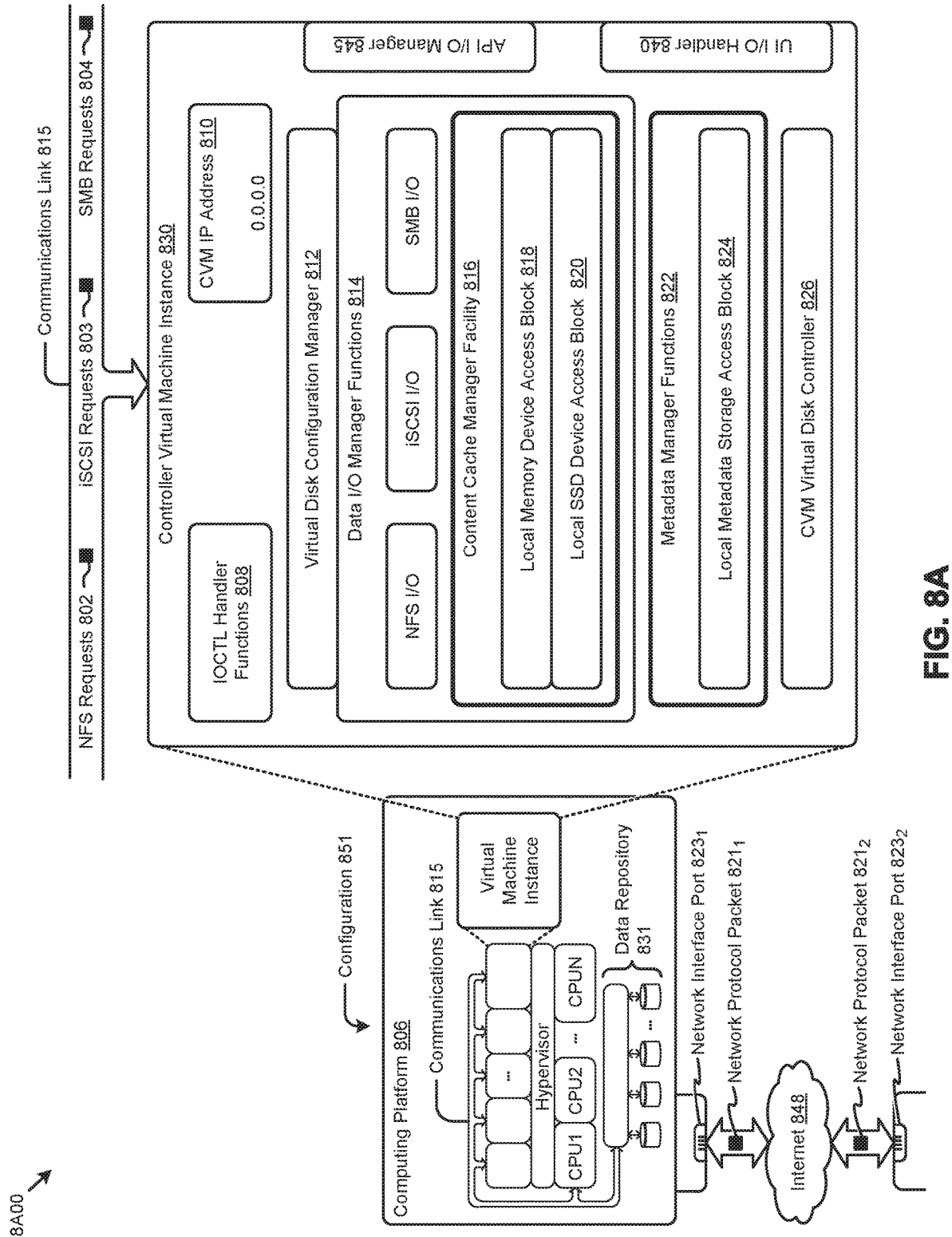
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or JO) as received from any or every source within the computing platform. An example implementation of such a virtual machine that processes storage I/O is depicted as 830.

In this and other configurations, a controller virtual machine instance receives block I/O (input/output or JO) storage requests as network file system (NFS) requests in the form of NFS requests 802, and/or internet small computer storage interface (iSCSI) block JO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or JO) can be handled by one or more JO control handler functions (e.g., IOCTL handler functions 808) that interface to other functions such as data JO manager functions 814 and/or metadata manager functions 822. As shown, the data JO manager functions can include communication with virtual disk configuration manager 812 and/or can include direct or indirect communication with any of various block JO functions (e.g., NFS JO, iSCSI JO, SMB JO, etc.).

In addition to block JO functions, configuration 851 supports JO of any form (e.g., block JO, streaming JO, packet-based JO, HTTP traffic, etc.) through either or both of a user interface (UI) handler such as UI IO handler 840 and/or through any of a range of application programming interfaces (APIs), possibly through API TO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 823$_1$ and network interface port 823$_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 821$_1$ and network protocol packet 821$_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to multi-zoned analysis of computing system metrics. In some embodiments, a module may include one or more state machines and/or combinational logic used to implement or facilitate the operational and/or performance characteristics pertaining to multi-zoned analysis of computing system metrics.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of multi-zoned analysis of computing system metrics). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to multi-zoned analysis of computing system metrics, and/or for improving the way data is manipulated when performing computerized operations pertaining to partitioning computing system metric observation spaces into multiple zones that are associated with respective analysis mechanisms to track system behaviors and raise alerts when behaviors are deemed to be anomalous.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
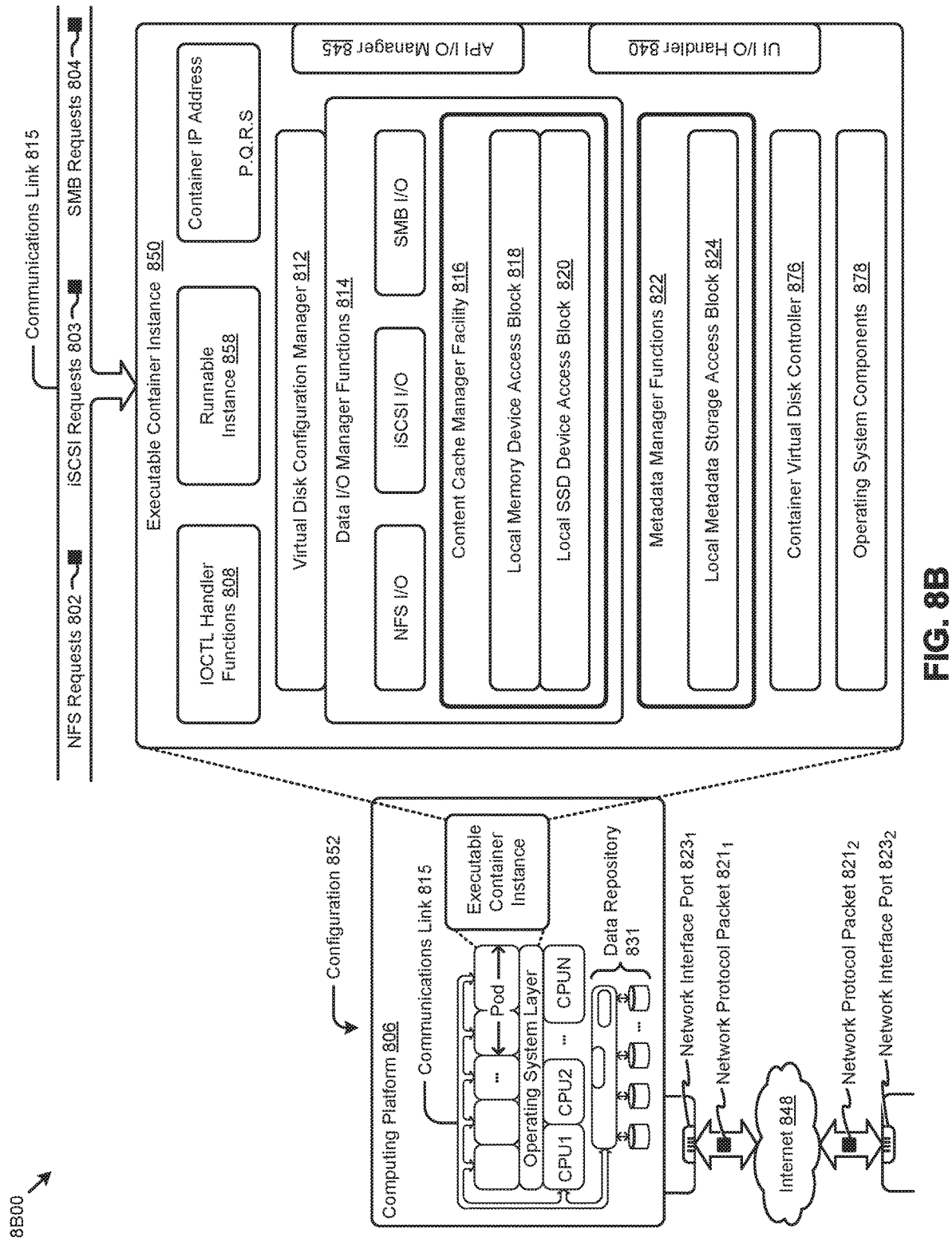

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls —a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
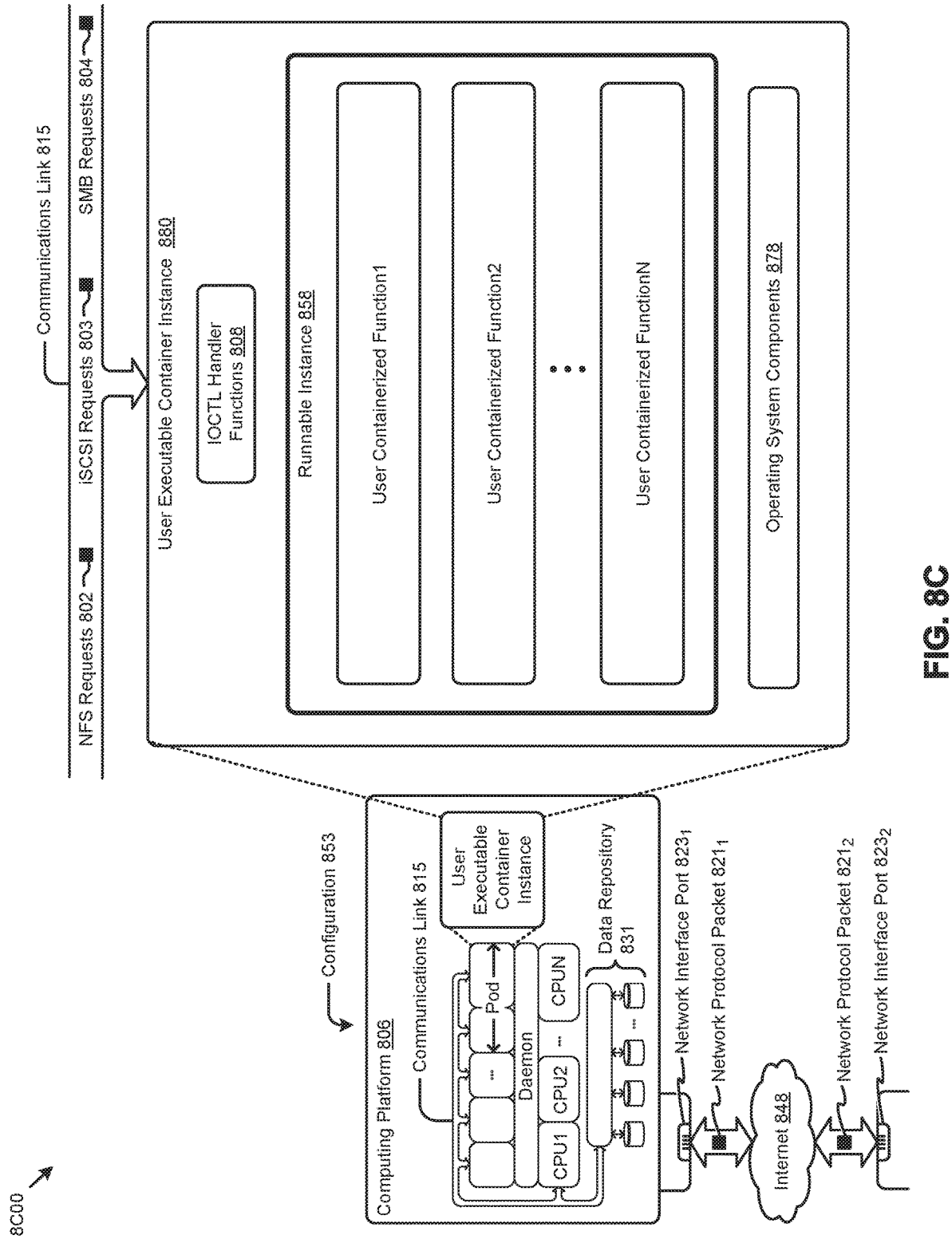

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown external data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
defining a first analysis zone that comprises a first metric observation space to define a first system metric value that corresponds to anomalous system behavior that raises an alert based on a first analysis technique;
defining a second analysis zone that comprises a second metric observation space to define a second system metric value that corresponds to normal system behavior based on a second analysis technique;
defining a third analysis zone that comprises a third metric observation space to define a third system metric value that lies between the first system metric value and the second system metric value that raises an alert based on a third analysis technique;
receiving a system observation of a computing system, the system observation having an observed metric value; and
selecting an alert analysis process to analyze the system observation and generate a zone-based analysis outcome using at least one of the first analysis zone, the second analysis zone, or the third analysis zone.

2. The method of claim 1, wherein an alert operation is initiated using at least one of, a threshold comparator, a rule-based logic, an anomaly detector, a statistical model, or a predictive model.

3. The method of claim 1, wherein an analysis zone is defined at least in part by a zone definition.

4. The method of claim 1, wherein the zone-based analysis outcome is based at least in part on an alert rule to an observed metric value.

5. The method of claim 1, wherein an alert operation is initiated based at least in part on the zone-based analysis outcome, the alert operation comprises at least one of, issuing an alert, issuing a recommendation, or invoking a mitigation operation.

6. The method of claim 1, wherein a fourth analysis zone is defined corresponding to a range of low measurements.

7. The method of claim 1, further comprising:
analyzing the observed metric value to generate a second zone-based analysis outcome, and determining a learning operation based at least in part on the second zone-based analysis outcome.

8. The method of claim 7, wherein determining the learning operation comprises applying a learning rule to the zone-based analysis outcome.

9. A non-transitory computer readable medium having stored thereon a sequence of instructions which, when stored in memory and executed by a processor causes the processor to perform a set of acts for monitoring a computing system, the acts comprising:
defining a first analysis zone that comprises a first metric observation space to define a first system metric value that corresponds to anomalous system behavior that raises an alert based on a first analysis technique;

defining a second analysis zone that comprises a second metric observation space to define a second system metric value that corresponds to normal system behavior based on a second analysis technique;

defining a third analysis zone that comprises a third metric observation space to define a third system metric value that lies between the first system metric value and the second system metric value that raises an alert based on a third analysis technique;

receiving a system observation of a computing system, the system observation having an observed metric value; and selecting an alert analysis process to analyze the system observation and generate a zone-based analysis outcome using at least one of the first analysis zone, the second analysis zone, or the third analysis zone.

10. The computer readable medium of claim 9, wherein an alert operation is initiated using at least one of, a threshold comparator, a rule-based logic, an anomaly detector, a statistical model, or a predictive model.

11. The computer readable medium of claim 9, wherein an analysis zone is defined at least in part by a zone definition.

12. The computer readable medium of claim 9, wherein the zone-based analysis outcome is based at least in part on applying an alert rule to an observed metric value.

13. The computer readable medium of claim 9, wherein an alert operation is initiated based at least in part on the zone-based analysis outcome, the alert operation comprises at least one of, issuing an alert, issuing a recommendation, or invoking a mitigation operation.

14. The computer readable medium of claim 9, wherein a fourth analysis zone is defined corresponding to a range of low measurements.

15. The computer readable medium of claim 9, further comprising instructions which, when stored in memory and executed by the one or more processor causes the processor to perform acts of:

analyzing the observed metric value to generate a second zone-based analysis outcome, and determining a learning operation based at least in part on the second zone-based analysis outcome.

16. The computer readable medium of claim 15, wherein determining the learning operation comprises applying a learning rule to the zone-based analysis outcome.

17. A system for monitoring a computing system, the system comprising:

a storage medium having stored thereon a sequence of instructions; and a processor that execute the instructions to cause the processor to perform a set of acts, the acts comprising, defining a first analysis zone that comprises a first metric observation space to define a first system metric value that corresponds to anomalous system behavior that raises an alert based on a first analysis technique;

defining a second analysis zone that comprises a second metric observation space to define a second system metric value that corresponds to normal system behavior based on a second analysis technique;

defining a third analysis zone that comprises a third metric observation space to define a third system metric value that lies between the first system metric value and the second system metric value that raises an alert based on a third analysis technique;

receiving a system observation of a computing system, the system observation having an observed metric value;

selecting an alert analysis process to analyze the system observation and generate a zone-based analysis outcome using at least one of the first analysis zone, the second analysis zone, or the third analysis zone.

18. The system of claim 17, wherein an alert operation is initiated using at least one of, a threshold comparator, a rule-based logic, an anomaly detector, a statistical model, or a predictive model.

19. The system of claim 17, wherein an analysis zone is defined at least in part by a zone definition.

20. The system of claim 17, wherein the zone-based analysis outcome is based at least in part on applying an alert rule to an observed metric value.

* * * * *